United States Patent [19]
Komachiya et al.

[11] Patent Number: 5,693,936
[45] Date of Patent: Dec. 2, 1997

[54] PHYSICAL QUANTITY DETECTING APPARATUS AND INTERNAL COMBUSTION ENGINE CONTROL APPARATUS EACH UTILIZING OPTICAL FIBER

[75] Inventors: Masahiro Komachiya, Hitachi; Shigeru Oho, Katsuta; Satoshi Shimada, Hitachi; Seiko Suzuki, Hitachiota; Takao Sasayama, Hitachi; Minoru Takahashi, Mito; Masahiro Kurita, Katsuta, all of Japan

[73] Assignee: Hitachi, Ltd., Tokyo, Japan

[21] Appl. No.: 233,749

[22] Filed: Apr. 26, 1994

[30] Foreign Application Priority Data

Apr. 27, 1993 [JP] Japan ..................... 5-100713

[51] Int. Cl.$^6$ ........................................ H01J 5/16
[52] U.S. Cl. ........................... 250/227.17; 73/705
[58] Field of Search ................... 250/231.19, 227.14, 250/227.16, 227.17; 73/705, 715

[56] References Cited

U.S. PATENT DOCUMENTS

| | | | |
|---|---|---|---|
| 4,477,725 | 10/1984 | Asawa et al. | 250/231 R |
| 4,693,221 | 9/1987 | Nakajima et al. | |
| 4,727,254 | 2/1988 | Wlodarczyk | 250/338 |
| 4,734,577 | 3/1988 | Szuchy | 250/227.16 |
| 4,735,212 | 4/1988 | Cohen | 128/667 |
| 4,770,492 | 9/1988 | Levin et al. | |
| 4,846,547 | 7/1989 | Falco et al. | 350/96.29 |
| 5,031,987 | 7/1991 | Norling | 350/96.15 |
| 5,064,270 | 11/1991 | Turpin et al. | 350/96.29 |
| 5,067,815 | 11/1991 | Kotrotsios et al. | 356/345 |
| 5,093,569 | 3/1992 | Krumboltz et al. | 250/227.16 |
| 5,196,694 | 3/1993 | Berthold et al. | 250/227.16 |
| 5,317,147 | 5/1994 | Bändliker et al. | 250/227.17 |
| 5,380,014 | 1/1995 | Schaperkotter | 277/2 |
| 5,385,053 | 1/1995 | Wlodarczyk et al. | 73/705 |
| 5,390,546 | 2/1995 | Wlodarczyk et al. | 73/715 |

FOREIGN PATENT DOCUMENTS

| | | |
|---|---|---|
| 40 31 941 | 4/1991 | Germany . |
| 40 01 475 | 7/1991 | Germany . |
| 41 03 327 | 10/1992 | Germany . |
| 42 30 374 | 3/1994 | Germany . |
| 60-166739 | 8/1985 | Japan . |
| 1-176618 | 7/1989 | Japan . |
| 3-237761 | 10/1991 | Japan . |
| 2 125 161 | 2/1984 | United Kingdom . |
| WO 91/13329 | 9/1991 | WIPO . |

OTHER PUBLICATIONS

IEEE Transactions on Instrumentation and Measurement, vol. 39, No. 5, Oct. 1990, pp. 715–721, "Development of a Polarimetric Optical Fiber Sensor for Electronic Measurement of High Pressure", W. J. Bock, et al.

Research Disclosure, No. 295, p. 935, Nov. 1988, "Fiber Optic Combustion Pressure Sensor in Spark Plug", E. W. Lankheet, et al.

Patent Abstracts of Japan, vol. 13, No. 587 (P-983) Dec. 25, 1989, & JP-A-01 250 909.

Patent Abstracts of Japan, vol. 17, NO. 369 (P-1572) Jul. 12, 1993, & JP-A-05 060 781.

*Primary Examiner*—Stephone Allen
*Attorney, Agent, or Firm*—Antonelli, Terry, Stout, & Kraus, LLP

[57] ABSTRACT

A physical quantity detecting apparatus comprises at least one optical fiber, at least one light emitting means for emitting an incident light beam on the optical fiber, at least one light receiving means for detecting an outgoing light beam from the optical fiber, physical quantity applied position information generating means for providing information indicative of a position of a portion at which a physical quantity is applied to the optical fiber, and operation means for receiving signals from the light receiving means and physical quantities applied position information generating means and calculating a change with time in physical quantity at respective positions on the optical fiber.

58 Claims, 27 Drawing Sheets

PHYSICAL QUANTITY DETECTING APPARATUS AND INTERNAL COMBUSTION ENGINE CONTROL APPARATUS EACH UTILIZING OPTICAL FIBER

BACKGROUND OF THE INVENTION

The present invention relates to a physical quantity detecting apparatus and an internal combustion engine control apparatus each utilizing an optical fiber for detection of a physical quantity, such as pressure, acceleration and temperature.

The physical quantity detecting apparatus is sometimes required to be so designed as to have the ability to perform not only detection of a physical quantity at a single site, but also simultaneous detection of physical quantities at many sites or the parallel detection of changes with time in the physical quantities.

A conventional example of detection of physical quantities at many sites within a wide range is a tactile sensor described in Transactions, The Institute of Electronic Information and Communication Engineers of Japan, Vol. J74-C-II, No. 5 (1991), pages 411–420. In this sensor, a great number of pressure sensors are formed in an array on a silicon substrate and pressures at individual points are detected by corresponding pressure sensors.

In the aforementioned conventional example, pressure signals from the respective pressure sensors are sent to a signal processor through respective wiring lines and tactile information, i.e., a two-dimensional pressure distribution is calculated. Accordingly, pressures at the respective points can be determined precisely, but in order to detect pressure-applied states within a wide area, a large amount of information delivered out of a great number of pressure sensors must be processed, raising problems that the scale of the signal processor must be increased and the time taken for calculation to proceed becomes long.

On the other hand, in a control system constructed by using a physical quantity detecting apparatus, it is often necessary that a state of a physical quantity over the whole of a wide area be detected simultaneously with values of physical quantities at individual points as fast as possible. For example, in an engine control system, pressures in respective cylinders of an engine constructed of a plurality of cylinders, that is, information concerning combustion states of all cylinders is required to be detected at a high speed in compliance with the speed of the engine.

The pressure sensor discussed above has been designed for electrically detecting pressure, and therefore when pressures in a plurality of engine cylinders are detected in parallel, electrical noises generated from ignition plugs are adversely detected by the pressure sensors.

Especially, in the engine compartment of an automobile, a great number of parts are arranged closely so that it is difficult to add parts to the existing parts, and hence it is difficult to make room for pressure sensors additionally provided to all of the cylinders.

On the other hand, a pressure detecting mat described in JP-A-1-176618 is available as an optical pressure sensor which does not require electrical detection of pressure. According to this, a plastic optical fiber is sandwiched in between rubber mats to which there is applied a pressure to be detected. The optical fiber is deformed depending on the pressure, and the pressure applied to the rubber mats is detected on the basis of a change in the amount of light or optical power passing through the optical fiber.

Also, an arrangement for detection of pressure in an engine cylinder is disclosed in "Jidosha Kogaku" (Motor Car Technology) published in August, 1992, pp 78–79. According to this, one of a plurality of cylinders is defined as a reference cylinder, an electrical pressure sensor is provided for only the reference cylinder, and the fuel supply amount for each cylinder is controlled on the basis of a change with time (time-varying change) in the pressure in the reference cylinder as detected by the pressure sensor.

SUMMARY OF THE INVENTION

An object of the present invention is to provide a physical quantity detecting apparatus utilizing an optical fiber and having the ability to easily detect physical quantities distributed in a certain area.

Another object of the present invention is to provide a physical quantity detecting apparatus utilizing an optical fiber and having the ability to easily detect physical quantities at a plurality of sites in a certain area.

Another object of the present invention is to provide a physical quantity detecting apparatus utilizing an optical fiber and having the ability to easily detect physical quantities in a member constituting an engine.

According to the present invention, there are provided at least one optical fiber, at least one light emitting means for emitting an incident light beam on the optical fiber, at least one light receiving means for detecting an outgoing light beam from the optical fiber, physical quantity applied position information generating means for providing information indicative of a position of a portion at which a physical quantity is applied to the optical fiber, and operation means for receiving signals from the light receiving means and physical quantity applied position information generating means and for calculating a change with time in a physical quantity at each position on the optical fiber.

Since changes with time in physical quantities at individual partial areas are all superimposed on each other, a change with time in intensity of an outgoing light beam from the optical fiber provides information concerning a physical quantity which covers the whole area. On the other hand, since the physical quantity applied position information generating means provides position information of a portion at which a physical quantity is applied, a physical quantity in correspondence to each partial area can be detected on the basis of the position information and an output signal of the optical fiber.

DESCRIPTION OF THE PREFERRED EMBODIMENTS

The present invention will now be described in greater detail by referring to embodiments directed to the previously-described cylinder internal pressure sensor for detecting pressures in a plurality of engine cylinders.

[First Embodiment]

Figure 1:
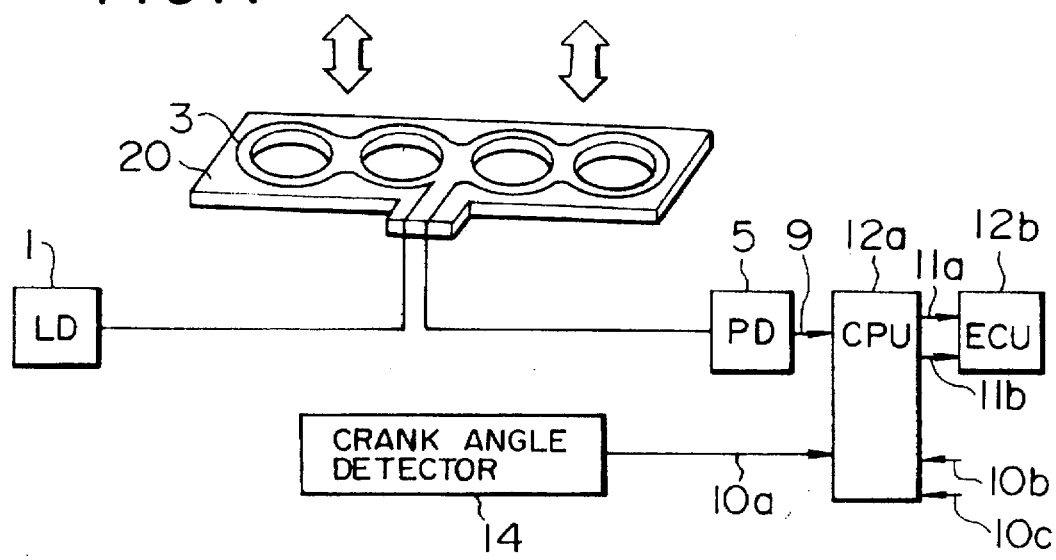
FIG. 1 is a diagram showing the construction of a first embodiment of a cylinder internal pressure sensor according to the present invention.

The construction of a first embodiment of an engine cylinder internal pressure sensor according to the present invention is shown in FIG. 1. An engine gasket 20 is fitted between a cylinder block and a cylinder head of an engine. Thus, the gasket 20 is sandwiched in between the upper cylinder block and the lower cylinder head and clamped by means of bolts so as to be compressed. A light beam emitted from a laser diode 1 serving as a light source passes through an optical fiber 2 having a cross-sectional structure providing an axially asymmetrical refractive index distribution, in which the core shape or the internal stress are axially asymmetrical (called an optical fiber having an inner birefringent index or a birefringent index fiber), and reaches a pressure detecting portion 3 of the optical fiber mounted on the engine gasket 20. The optical fiber is embedded directly in the gasket. The birefringent index fiber 3 undergoes, at its pressure detecting portion, a change in refractive index complying with an external pressure applied to the pressure detecting portion. As a result, the propagating light in the optical fiber suffers an external radiation loss and the intensity of the propagating light changes. The light intensity of the light beam which has passed through the pressure sensing portion is detected by a photodiode serving as a light receiving means and a detection signal 9 is sent to a sensor signal processor 12a. When receiving the detection signal 9, the sensor signal processor 12a processes this signal, together with a signal 10a from a crank angle sensor (a sensor for timing reference such as an ignition sensor) as well as a reference signal 10b from a temperature sensor and a reference signal 10c from an air flow rate sensor or an atmospheric pressure sensor, and transmits an output signal 11a to an engine control unit 12b. In the event that the signal 9 from the optical system is recognized to have any abnormality in comparison with a preset reference, for example, when the signal is recognized to be extremely low owing to breakage of the fiber, the processor 12a issues an operation confirmation signal 11b which urges the engine control unit 12b to switch the engine control mode.

Figure 2:
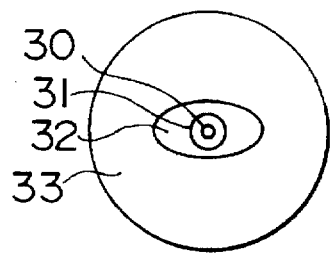
FIG. 2 is a sectional view showing an example of a birefringent index fiber.

The optical fiber serving as a sensor must stably provide a large change in the amount of light or optical power which follows a change in internal stress with high fidelity. This requirement can be satisfied by using an optical fiber having an inner birefringent index (birefringent index fiber). The birefringent index fiber has a cross-sectional structure which makes the distribution of the refractive index of the fiber asymmetrical to the axis thereof. FIG. 2 shows a fiber cross-sectional view of an example of the birefringent index fiber. An elliptical jacket 32 provided as shown in the Figure applies an isotropic stress to an optical fiber core 30 and a cladding 31, so that the inner birefringent index is allowed to take place. When the optical fiber internally pre-stressed is used as in the present embodiment, a state in which light is permitted to propagate through the optical fiber and a state in which the light propagation is not permitted can be switched easily from one to the other in response to a small change in inner refractive index and therefore a relatively large change in the amount of light can be obtained stably by "bending (curving)" or "pressing" the optical fiber. As an example, an elliptical jacket fiber having a W type refractive index distribution can be used practically as a fiber for a polarizer. This kind of fiber exhibits good sensitivity characteristics in internal pressure sensing as will be described hereinafter. Of course, other types of birefringent index fiber, such as a panda type, bow tie type, side pit type and elliptical core type, can be used for adjustment of the sensitivity.

When the mounting of the engine is carried out, a force due to clamping of bolts acts vertically on the gasket surface and consequently the optical fiber 3 is pressed from above and below, leading to a state in which the quantity of propagating light is decreased (a state in which the light beam hardly passes). On the other hand, when an increase in pressure occurs concomitantly with explosive combustion in a cylinder, the clamping force of the bolts is slackened slightly and the optical fiber is released from "pressing" by an amount which can be detected as an increase in the quantity of light propagating through the optical fiber.

Figure 3:
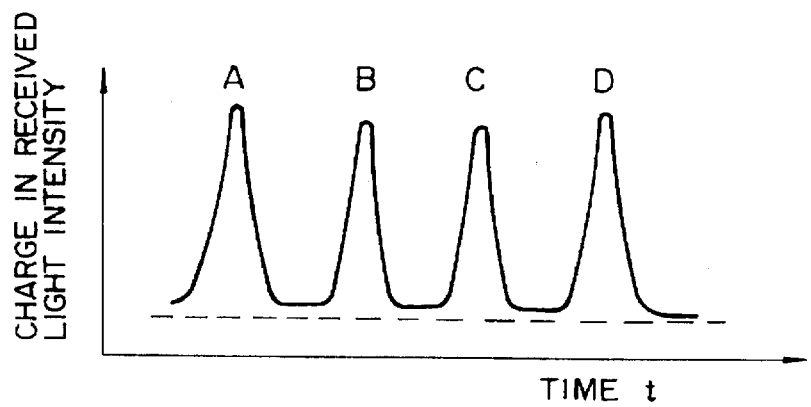
FIG. 3 is a graph showing an example of an output signal from the first embodiment of the cylinder internal pressure sensor or in-cylinder pressure sensor according to the present invention.

FIG. 3 shows, in conceptual form, an example of the detected output signal. Each pulse-like increase in light intensity corresponds to the combustion in each cylinder. The pulse-like signals are separated clearly because the combustion timings are shifted from each other. It is to be noted that, since the cylinder internal pressure is far larger during the combustion stroke than during other strokes of suction, compression and exhaust, the peak of the output can be deemed to indicate a cylinder internal pressure during combustion. Taking a four-cycle engine, for instance, peaks A, B, C and D correspond to combustion in first, second, third and fourth cylinders in the order of the combustion cycle, respectively. The peak interval is ¼ of the combustion cycle and amounts to about 10 ms, though depending on the engine revolution number. In the event that abnormal combustion occurs in the cylinder, a vibration (knocking) of a high frequency is superimposed on the illustrated curve. Also, in the event of the occurrence of a misfire due to a change in air/fuel ratio, the peak value of the curve decreases. Accordingly, by capturing such an output fluctuation as above through a processing of the output signal, a change in combustion state can be known. For example, a specified frequency component of knocking can be extracted and measured through a processing of the signal in the frequency region, such as by Fourier transformation, frequency filtering or modulation processing. A misfire can be captured quickly, for example, by counting the number of the signal peak falling below a predetermined value. This is possible even when the misfire stems from any cylinder. Further, through comparison with a theoretical presumptive internal pressure curve, the peak position can be fitted accurately to a correct value and the condition of superimposition of signals from respective cylinders can be known. In addition, by carrying out pattern recognition based on the whole shape of the signal curve, such as an output waveform over a constant time, a certain combustion state can also be extracted.

As described above, according to the cylinder internal pressure sensor of the present embodiment, the combustion state can be monitored over all of the cylinders.

The position of a cylinder in which combustion is taking place, that is, a position at which a pressure is applied to the optical fiber can be known from an output of the crank angle sensor with a proper encoding system, for example, with a subsidiary gear which rotates 360° during one combustion cycle. Accordingly, by using the photodiode output and the crank angle sensor output in combination, combustion pressure measurement at each cylinder can be accomplished. The crank angle sensor serves as a pressure applied position information generating means for providing information corresponding to the position of a portion at Which a pressure to be applied to the optical fiber is applied or as means for identifying the individual sensing portions. Accordingly, even during lean combustion control, for example, an increase in knocking and the occurrence of a misfire can be captured rapidly over all of the cylinders and at the same time, and fine control of each cylinder, such as air/fuel ratio adjustment, can be effected independently.

Figure 4:
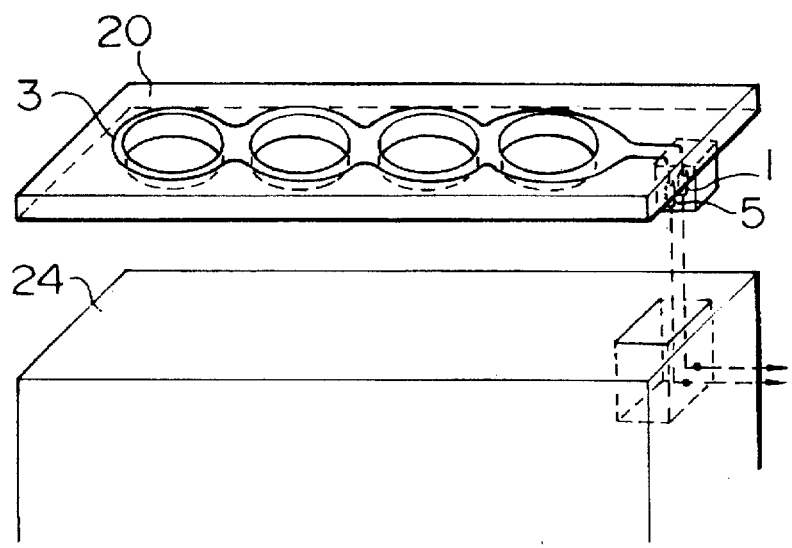
FIG. 4 shows an example of the construction in which an optical fiber built-in gasket and an optical system are unified.

FIG. 4 shows an example of a mounting in which an optical fiber built-in gasket 20, a light source 1 and light receiving means 5 are unified. This unification or integration makes handling of the optical fiber built-in gasket during engine assembly easy and permits the sensor output to be taken out directly and electrically, thus simplifying the connection to an external wire harness. Of course, supply of power to the respective modules of the light source and the light receiving means can be accomplished similarly to the signal wiring.

By changing the optical fiber wiring, fitting portions of the light source and light receiving means can be installed at any position which is peripherally, interiorly or exteriorly of the gasket. For example, as shown in the Figure, the light source and light receiving means are packaged in the cylinder block to make the installation easy even when the are in the neighborhood of the engine is congested. To prevent the light source and light receiving means from suffering a large change in temperature, an installation which takes the arrangement of cooling water into account can also be undertaken.

As described above, according to the present embodiment, the detecting portion serving as a main portion for detection of cylinder internal pressure can be realized with only the light emitting and receiving devices and the optical fiber embedded in the engine gasket, thus attaining the effects that the states of all of the cylinders can be captured and at the same time internal pressures in the individual cylinders can be detected and controlled with a very simplified construction.

[Second Embodiment]

Figure 5:
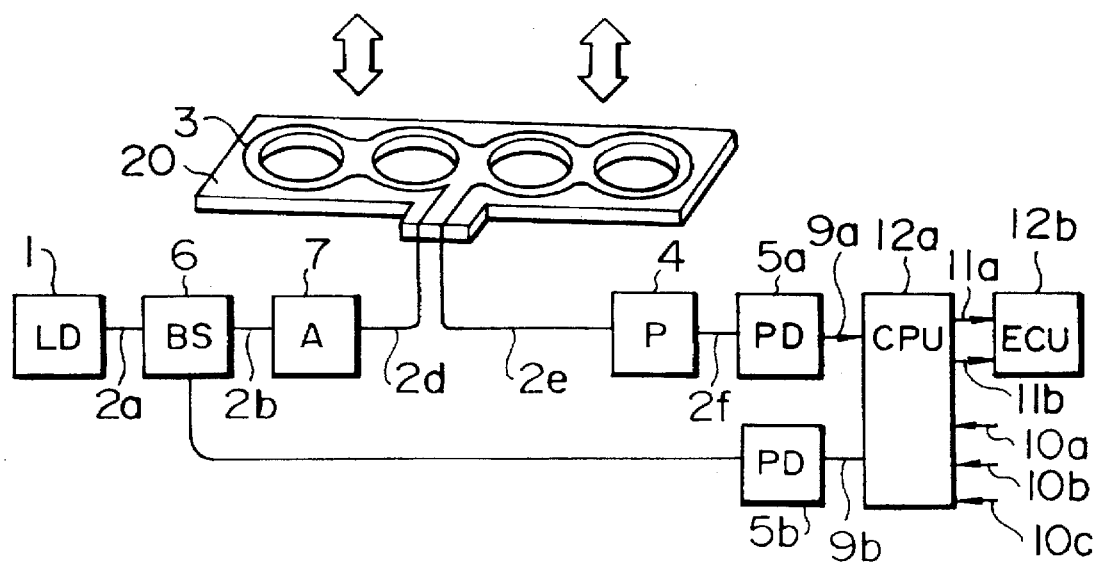
FIG. 5 is a diagram showing the construction of a second embodiment of the cylinder internal pressure sensor according to the present invention.

FIG. 5 shows the construction of a second embodiment of the present invention. While in the first embodiment a change in light intensity of the entire propagating light signal is captured, a change in light intensity of polarized components of the optical fiber propagating light is detected in the present embodiment. A light beam emitted from a laser diode 1 passes through a fiber 2a for light transmission and is split by means of a beam splitter 6. One light beam, split to such an extent that it does not affect measurement accuracy, passes through a fiber 2c for light transmission to reach a photodiode 5b and a light intensity signal 9b detected thereby is used for correction of fluctuation in the light source power in a sensor signal processor 12a. For the convenience of explanation, stabilization of the sensor operation by light source power control is described in the present embodiment for the first time, but obviously it can also be applied to the first embodiment set forth so far. The laser diode serving as the light source is sometimes provided in advance with a photodiode operating as an output monitor. In this case, the built-in photodiode can be used as the photodiode 5b and the beam splitter 6 and optical fiber 2c can be omitted. The other light beam passes through a fiber 2b for light transmission to reach an incident polarized wave controller (phase setting device of the polarized light) 7, at which the polarized state of the light beam is adjusted, and thereafter passes through a fiber 2d for light transmission and an optical fiber fusing port 8a to reach an optical fiber 3 for pressure detection mounted on a four-cylinder engine gasket 20. A change in pressure applied to the optical fiber 3 causes the quantity of transmitting light to change as described previously, and at the same time, from the viewpoint of the independent polarization modes of the optical fiber propagating light, it has been known that the light intensity ratio between respective polarized components changes in accordance with a change in refractive index of the optical fiber. The light beam thus undergoing a change of polarized states passes through an optical fiber fusing port 8b and a fiber 2e for light transmission to reach a polarizer 4 at which only a necessary polarized component is extracted. Light intensity of the polarized component selected by the polarizer 4 is detected by a photodiode 5a and a detection signal 9a is sent to the aforementioned sensor signal processor 12a. For example, when a fiber type polarizer is used as the polarizer, the light beam need not be taken out of the optical fiber, and hence the construction of the optical system can be simplified. When a polarization splitter is used in place of the polarizer, comparative measurement of light intensity of the two polarized components can be effected and a change in the light intensity ratio can be measured directly. Accuracy of measurement can also be enhanced. When receiving the detection signals 9a and 9b, the sensor signal processor 12a processes these signals together with reference signals 10a, 10b and 10c from a sensor for detection of combustion timing for each cylinder, an ambient temperature sensor and an atmospheric pressure sensor, respectively, as in the case of the foregoing first embodiment, and thereafter transmits an output signal 11a to an engine control unit 12b. In the event that any abnormality is recognized in the signals 9a and 9b, the control unit issues an operation confirmation signal 11b which commands switching to a fixed engine control mode.

Generally, a single mode optical fiber is preferably used for measurement based on a change in polarized state. In the present embodiment, a single mode optical fiber for detection of a change in polarized state can be used for the pressure detecting portion 3 and a single mode optical fiber having an inner birefringent index (ordinary birefringent index fiber) can be used as the fiber 2 for light transmission in order to avoid polarization fluctuation at a portion other than the detecting portion. Of course, by selectively using various types of optical fiber as the optical fiber 3, the sensitivity can be changed in accordance with the condition of measurement. For example, when a birefringent index fiber of the side pit type is used, the change in polarized state of the propagating light can be varied by changing the direction of application of pressure to the polarization maintaining axis, as described in "Single Mode Fibers with Asymmetrical Refractive Index Pits on Both Sides of Core" by T. Hosaka et al, Electronics Letters, Vol. 17, No. 5 (1981), 191. Accordingly, by using a birefringent index fiber of the above kind for the pressure sensing portion, a pressure sensor having effective sensitivity in only a specified direction can be constructed. In general, since the polarization maintaining axis of the birefringent index optical fiber usually fluctuates along the optical fiber in the longitudinal direction, pressure applying means for specifying a pressure application point is efficiently utilized when directive pressure detection is carried out pursuant to the above method. In that case, by using an optical fiber having axially asymmetrical form or by drawing a marker indicative of detectable direction on the optical fiber, the optical fiber arrangement can be controlled easily. Obviously, when an optical fiber of one kind is used in FIG. 5, the optical fiber fusing ports 8a and 8b can be omitted to simplify the structure.

Figure 6:
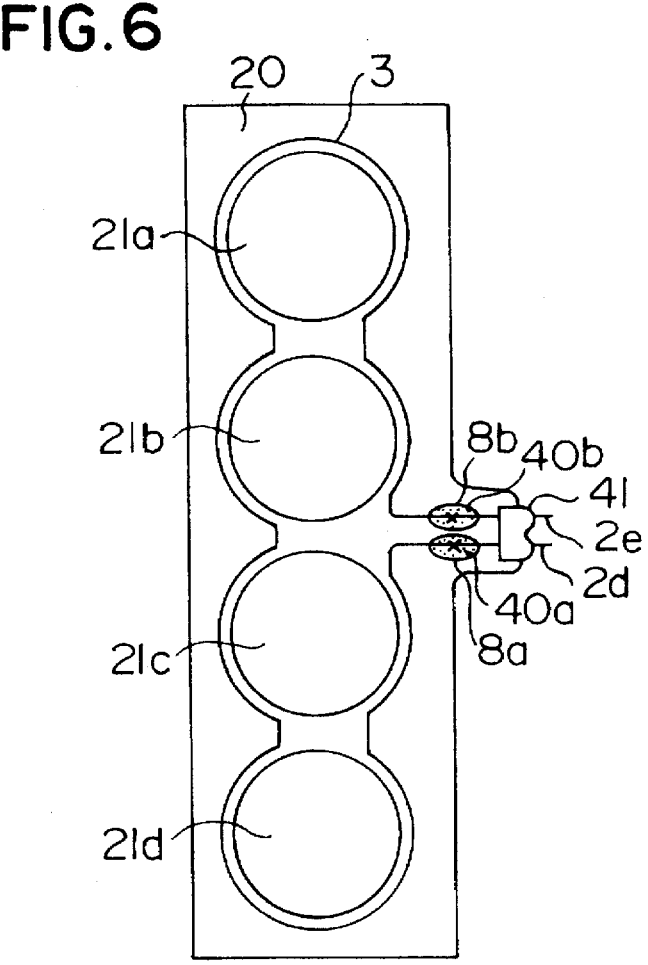
FIG. 6 shows an example of the construction of an optical fiber built-in four cylinder engine gasket.

FIG. 6 shows an example of mounting of an optical fiber to a four-cylinder engine gasket. An optical fiber 2d for light transmission is inserted into a gasket through an optical fiber protective cap 41 and connected to an optical fiber 3 for pressure detection by fusing. For easy handling of the optical fiber, the protective cap is formed with, for example, side slits through which the optical fibers are set into the cap. A fusing port 8a is protected by a damage preventive protector 40a. Obviously, when only an optical fiber of one kind is used as in the first embodiment of the present invention, the structure of the fusing port can be omitted. In the present drawing and drawings to be referred to hereinafter, the structure having the fusing port will mainly be depicted for generality of description, but the illustration may be modified to meet a case where an optical fiber of one kind is used in a similar manner by omitting the fusing port. The optical fiber 3 for pressure detection traces a closed loop to surround engine cylinder holes 21a, 21b, 21c and 21d and is then taken out of the gasket through an optical fiber fusing port 8b and the optical fiber protective cap 41. Of course, the inlet and outlet positions of the optical fiber can be changed easily by changing wiring of the optical fiber. This makes it possible to flexibly cope with the environmental condition around the engine to which the gasket is mounted. In the Figure, the optical fiber wiring is symbolically depicted but for efficient packaging, an optical fiber having a large inner birefringent index may be wired such that its direction change is effected as smoothly as possible to prevent a loss of the amount of light due to, especially, bending from growing.

Figure 7:
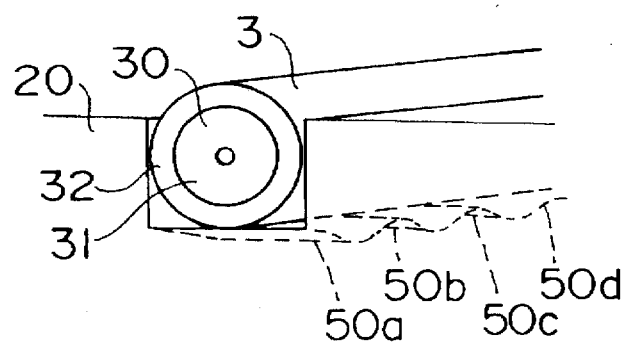
FIG. 7 is a diagram showing an example of packaging of an optical fiber in a gasket.

FIG. 7 shows, in sectional form, an example of mounting of an optical fiber on the four-cylinder engine gasket. A groove having a width sufficient for an optical fiber 3 to be embedded therein is formed in one surface of a gasket and the optical fiber is set in the groove. In the Figure, for simplicity of illustration, an ordinary single mode optical fiber is exemplified in sectional form but obviously, an optical fiber having one of the aforementioned various cross-sectional structures can be used as the optical fiber. The depth of the groove depends on the material and shape of an optical fiber jacket 32, a cladding 31 and a core 30 and is adjusted such that sufficient force is applied to the optical fiber core 30 without breaking the core. In the example illustrated in the Figure, the depth is adjusted to provide pressure enhancing points 50a to 50d at a single or a plurality of sites. Sensitivity can be adjusted by changing the number of the pressure enhancing points. The embedding groove maybe made to be sufficiently deep for protection of the optical fiber and for example, highly heat-proof rubber pieces may be placed in the groove at specified positions to provide a pressure applying structure. Packaging may be adopted wherein an optical fiber and a necessary pressure applying structure are totally embedded within a gasket during manufacture.

From the standpoint of embedding and working of the optical fiber, the embodiment of FIG. 6 is featured in that the optical fiber does not overlap and the depth of the groove can be uniform. Of course, by adjusting the depth of the embedding groove, the optical fiber can also be wired so as to intersect. Usually, holes for gasket clamping bolts are often formed around each cylinder in the same way. Accordingly, by wiring the optical fiber around the individual cylinders in the same way, a slight displacement of clamping bolts due to a change in internal pressure can be obtained at each cylinder with the same sensitivity. Strictly, the wiring of the optical fiber and the groove are adjusted on the basis of a displacement expected to occur over the whole set of the bolts and gasket. As will be seen from the above example, wiring of the optical fiber to the gasket can be modified easily and therefore the sensing system construction can be realized in a variety of forms in accordance with the individual measurement conditions.

Response and/or sensitivity of the optical fiber built-in gasket sensor depends on the optical fiber jacket (or support) as well as mechanical characteristics of the bolts and gasket. Accordingly, by selecting the materials of the bolts and the gasket in addition to adjustment of the optical fiber wiring and the embedding groove, the sensitivity and response of the sensor can be adjusted as necessary. Irregularity in clamping during initial packaging of the gasket or the like factors may affect the sensor sensitivity, but the influence can be avoided by calibration carried out when an engine starts. Thus, when the constituent member per se of the engine is utilized as a pressure transmission/application mechanism, a special pressure transmission mechanism need not be provided as described above and the construction of the whole system can therefore be simplified.

Figure 8:
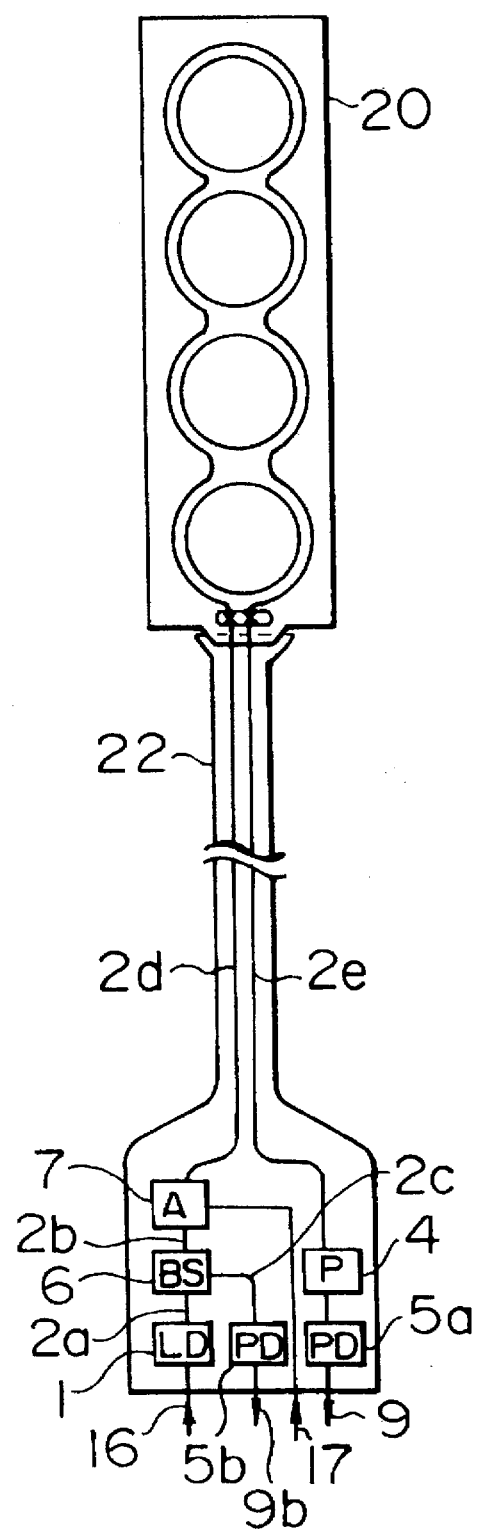
FIG. 8 shows an example of integration in which the distance between a gasket and an optical system module is adjustable.

FIG. 8 shows an example of packaging in which an optical fiber built-in gasket and the optical system controlling the polarized light are unified. In the present construction, an optical fiber 2 (2d, 2e) for light transmission is shielded with a protective member 22 of a necessary length so that the distance to the gasket body may be adjusted. In the Figure, reference numeral 16 designates a light source output control signal and 17 a control signal to the polarized state controller. Obviously, the unification or integration can also be effected by selecting part of the optical system as represented by only the light source and light receiving means.

According to the present embodiment, since a fluctuation in light source power is corrected, stabilization of the sensor operation can be achievable for in-cylinder pressure sensing. Also, when the birefringent index fiber is used, the sensitivity of detection based on a change in the polarized state at the sensing portion can be optimized easily by setting incident and detectable polarized components in compliance with the polarization maintaining axis of the fiber.

[Third Embodiment]

Instead of positively using the bolts and the gasket per se as the pressure transmission/application mechanism, a separate pressure transmission/application mechanism for exclusive use can also be adopted. In this case, the sensitivity and response of the sensor can be adjusted more freely without depending on materials of constituent members of the engine and the like factors.

Figure 9:
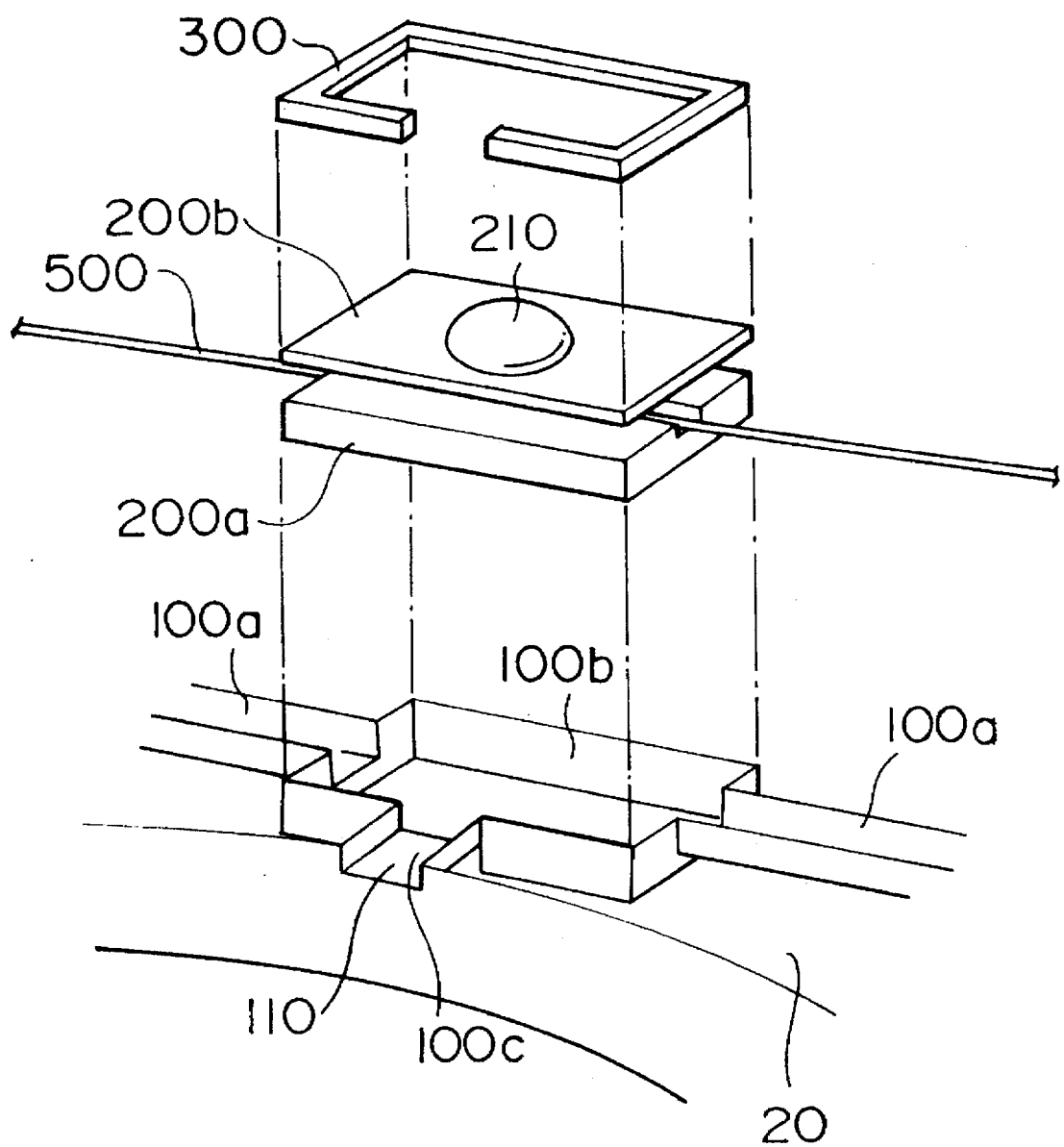
FIG. 9 is a diagram showing the construction of a sensing portion of a third embodiment of the cylinder internal pressure sensor according to the present invention.

FIG. 9 shows an embodiment based on the idea mentioned above. In the Figure, reference numerals 100a, 100b and 100c designate grooves (depicted exaggeratedly) formed in one surface of a gasket 20 and 110 designates an internal pressure inlet port through which a part of the groove 100b communicates with the interior of an engine cylinder. Generally, the grooves are designed to have widths and depths sufficient to receive an optical fiber 500 and structures 200a and 200b (mated with each other to provide a structure called a sensor block hereinafter) for applying to the optical fiber a bending corresponding to a change in cylinder internal pressure. More specifically, the groove 100a serving as an optical fiber receiving portion has a depth which is larger than an outer diameter dimension of the optical fiber 500 (under the use condition) to ensure that the optical fiber 500 is not subjected to any pressure generated concomitantly with clamping of the gasket during engine packaging. In this case, a groove depth change caused by a constrictive deformation of the gasket per se generated concomitantly with clamping must be taken into consideration. The groove 100b serving as a sensor block embedding portion has a depth which is larger than a height of the sensor block. This ensures that a spatial gap can be provided through which combustion pressure is admitted to be transmitted to the upper side of a diaphragm 210 as illustrated. The width and depth of the gasket groove 100c, having, on the cylinder side, the internal pressure inlet port 110, is determined in compliance with the size of the spatial gap. Through this, a response necessary for combustion pressure measurement can be determined. Further, a difference between the depth of the groove 100a in which the optical fiber 500 is embedded and the depth of the groove 100b in which the sensor block is embedded is adjusted to prevent the optical fiber 500 passing through the sensor block from receiving a surplus force at the inlet and outlet portions of the sensor block.

In the Figure, internal pressure seal means 300 is additionally provided on the diaphragm supporting portion 200b of the sensor block. Thus, a change in cylinder internal pressure can be converted into a difference between pressures prevailing above and below the diaphragm supporting portion 200b of the sensor block and then into a displacement of the diaphragm 210 reflecting the pressure difference. The principle of internal pressure measurement resides in that a change in the amount of light (optical power) passing through the optical fiber, due to a bending displacement, is detected. When the groove 100a is in communication with the outside of the gasket, atmospheric pressure is defined as a pressure reference. In this case, a change in pressure reference can be corrected by using, for example, an atmospheric pressure sensor in combination.

The above process of packaging the sensing portion can be summarized as follows:

(1) Rough working of the engine constituting member (gasket),
(2) Precise working of the pressure transmission means (sensor block) and
(3) Assembling adjustment of the two (including pressure sealing).

The fact that the packaging step and the accuracy of working are both set up step-wise, as described above, can be said to be effective when taking productivity into consideration. Since only a relatively simple groove forming working is required of the gasket serving as an engine constituting member, the function inherent in the gasket will not be impaired. Also, the pressure transmission means is separately constructed in the form of a block and therefore accurate adjustment of sensitivity of the diaphragm and positioning of the diaphragm relative to the optical fiber can be carried out steadily and easily. Further, even if the sensor block is not accurately positioned in the groove during packaging, internal pressure measurement can be conducted with the relative position between the optical fiber and the diaphragm optimized, if the internal pressure seal means functions sufficiently. Accordingly, packaging immune to any constraint imposed by the engine, which is difficult to work and has a small degree of freedom of working, can be accomplished.

During packaging, a cylinder head contacts the upper surface of the seal means 300. Accordingly, when the internal pressure seal means 300 is formed of a metal member having high thermal conductivity, heat in the sensor block generated due to combustion can be emitted to the cylinder head, thereby suppressing thermal deformation and deterioration of the sensing portion. With a view toward promoting airtightness, a sealing resin is also used for the internal pressure seal means 300 and in that case, deterioration of the sealing resin due to heat can also be prevented for the same reason. The heat radiating effect can of course be adjusted by controlling a contact area between the internal pressure seal means 300 and the cylinder head. Especially, the sensor block 200 (200a, 200b) and the internal pressure seal means 300 can be unified originally and therefore any adjustment required for packaging of this in a unitary or integral form can be carried out perfectly independently of the function of the gasket as an engine constituting member. The base portion 200a and diaphragm supporting portion 200b of the sensor block can be in overlapping relation to each other in use, as shown in the Figure, but when they are formed of, for example, metal members, the base portion 200a and diaphragm supporting portion 200b can be unified easily with the optical fiber 500, by spot-welding the peripheral portion of the block. Through this, a heat radiating effect can also be promoted.

The influence of thermal deformation of the diaphragm can also be avoided by providing, for example, an optical fiber for a reference signal in addition to the optical fiber for sensing and using the former fiber in combination with the latter fiber. The optical fiber for a reference signal is set to have the same bending condition as the sensing fiber but is made free from the in-cylinder pressure. Through a comparison processing of light quantities passing through the two optical fibers, a change in output due to other factors than an internal pressure applied to the diaphragm 210, for example, a drift due to the influence of temperature and a change in zero point due to irregularity caused during assembling of the sensor block, can be subtracted.

After the optical fiber is embedded, the groove can remain unchanged, but the optical fiber can be handled so as not to be moved by filling the groove with a filler of, for example, the same material as the carbon sheet constituting the gasket. A surplus length necessary for bending of the optical fiber can be maintained inside the sensor block.

Figure 10:
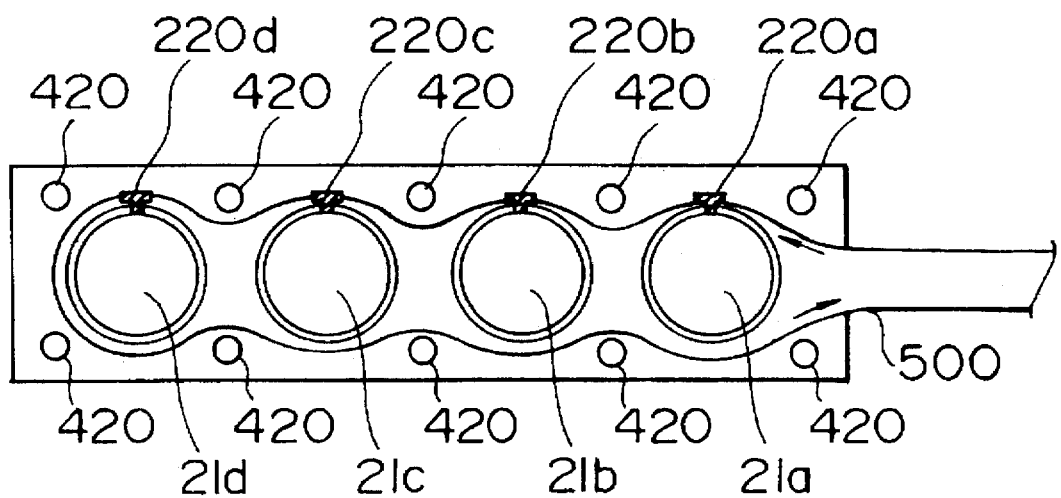
FIG. 10 shows an example of packaging of a sensor block to a gasket.

FIG. 10 schematically shows an example of packaging in which sensing portions are provided in association with a plurality of cylinders. An optical fiber 500 for sensing enters an optical fiber embedding groove from the outside of a gasket, sequentially passes by sensor block positions 220a, 220b, 220c and 220d at a plurality of sites and then goes out of the gasket. The respective sensor blocks are adapted to measure combustion pressures in respective cylinders 21a, 21b, 21c and 21d. Namely, an increase (or a decrease) in loss which the light undergoes at each of the sensor block positions 220a, 220b, 220c and 220d is measured in the form of a change in intensity of light having passed through the fiber. Even when the optical fiber is bent gradually, a sufficiently large change in the amount of light to affect sensing will not occur. Therefore, a groove for embedding the optical fiber can be formed so as to avoid holes 420 for bolts and cooling water formed in the gasket. Such a protective structure as shown in FIG. 6 may be provided at an inlet/outlet port of the optical fiber in a similar way.

Figure 11:
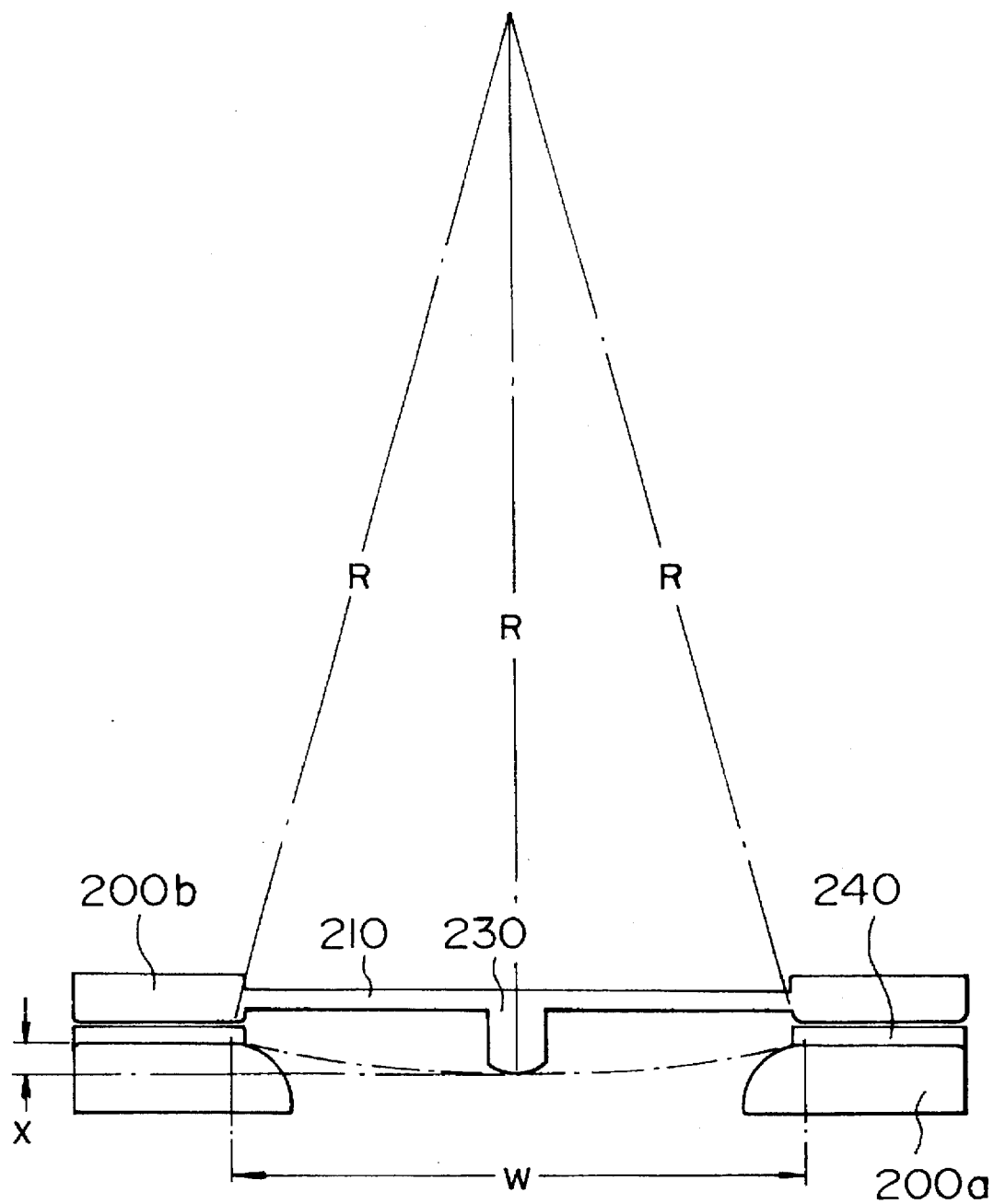
FIG. 11 is a sectional view showing an example of the sensor block.

FIG. 11 shows an example of the construction of the sensor block used in the third embodiment of the present invention. The Figure is a sectional view taken along a path of the optical fiber 500. The optical fiber passes through an optical fiber path 240 formed in a base 200a, passes under a diaphragm 210 while making contact with a projection 230 of the diaphragm and goes out of the sensor block through an opposite optical fiber path. The widths of the path 240 and the projection 230 are adjusted to keep the optical fiber 500 on the top of the projection 230 even when the optical fiber shifts in a direction vertical to the sheet of drawing. In this manner, the optical fiber bent with a radius of curvature R is supported at three points, two of which are at inlet and outlet portions of left and right optical fiber paths 240 spaced apart from each other by a distance w and one is at the tip of the diaphragm projection 230. Not only the above three points for supporting the optical fiber, but also entrance and exit portions for the optical fiber are rounded to prevent the optical fiber from being damaged by these edges. By adjusting the distance w and the height of the projection 230, the magnitude of initial bending of the optical fiber 500 can be set. When combustion takes place and internal pressure increases, an increased internal pressure is applied to the diaphragm 210 from above in the drawing. In accordance with a resulting displacement of the diaphragm, the degree of bending (radius of curvature) of the optical fiber changes. More particularly, when the combustion pressure increases, the radius of curvature becomes smaller than an initial value (bending becomes sharp) and when pressure which is negative relative to atmospheric pressure prevails in a cylinder during, for example, .fuel suction, the radius of curvature becomes larger (bending becomes blunt). To ensure correct measurement of positive and negative pressures, the diaphragm 210 is provided below the edge of the sensor block so as to have a structure which is symmetrical under the application of bending in both directions.

Figure 12:
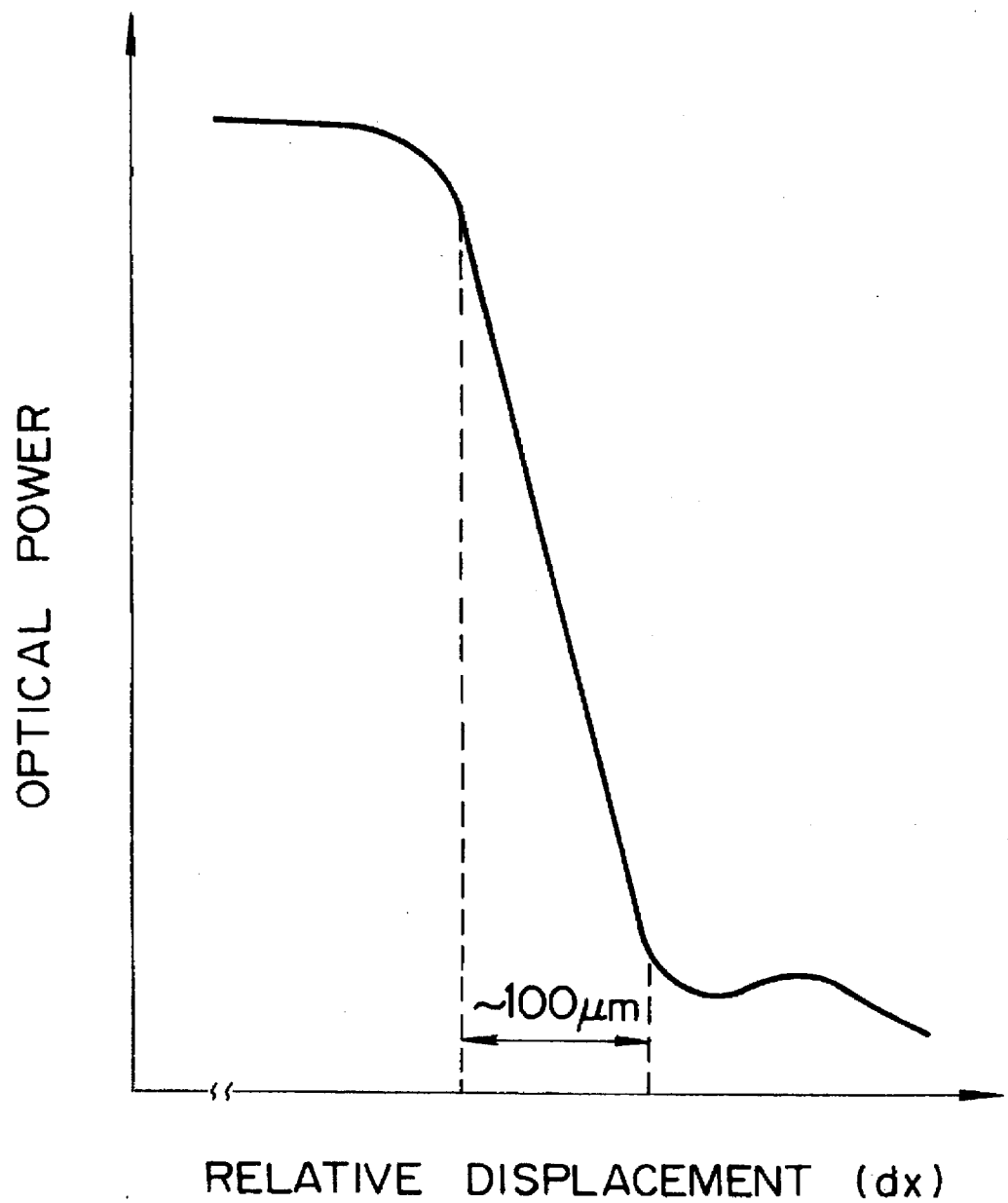
FIG. 12 is a graph useful to explain the relation between a change in optical power and the diaphragm displacement.
Figure 13:
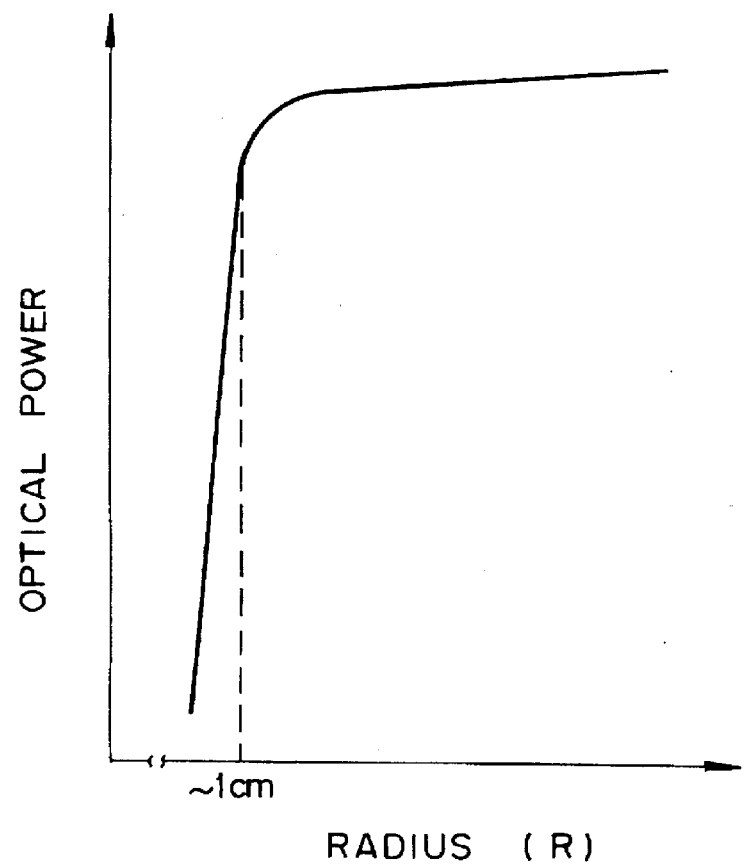
FIG. 13 is a graph useful to explain the relation between a change in optical power and the bending of optical fiber.

FIG. 12 diagrammatically shows an example of sensitivity measurement carried out by using an optical fiber classified into the category of birefringent index fiber. In particular, FIG. 12 shows an example of characteristics obtained when a light source having a wavelength λ of 0.83 µm and the optical fiber exemplified in FIG. 2 are used in combination. In the Figure, the ordinate represents a change in optical power (a change in quantity of light passing through the optical fiber) and the abscissa represents a displacement dx (an increase in dimension x shown in FIG. 11) of the diaphragm. As demonstrated in the Figure, the optical power begins to decrease rapidly at a position where the optical fiber is bent suitably. The optical power changes linearly over a range of about 100 µm, though depending on conditions, and the total amount of change is so large that it amounts to up to about 70% of the initial optical power. The same change is graphically shown in FIG. 13 where the abscissa represents the radius of curvature R applied to the optical fiber in place of the displacement. As demonstrated in the Figure, the optical power begins to decrease rapidly when the radius of curvature R of bending of the optical fiber falls below about 1 cm. Namely, when the above optical fiber is used, changes in optical power due to changes in positive and negative pressures can be measured linearly with high sensitivity on the condition that an initial bending value applied to the optical fiber is set to a certain value indicated by R<about 1 cm. Pursuant to the characteristic of FIG. 13, a change in bending will not greatly affect a change in optical power when the radius of curvature is larger than about 1 cm. Accordingly, as described above, gradual bending (R>1 cm) can be applied to the optical fiber wiring without affecting the accuracy of sensing. When the above characteristic is examined for a specified polarized component, it is found that at a bending radius of R+5 cm (approximating the cylinder inner radius) or less, the polarized component suffers an optical power loss changing practically over a wide range of from 0.1 dB/m or less to 10 dB/m or more. For sensing, an optical fiber can of course be utilized which is designed so as to largely change any polarized components similarly.

In the above example, the diaphragm 210 is designed so as to be displaced by approximately 10 to 20 microns when the cylinder internal pressure changes by, for example, several ten MPa. On the assumption that this degree of displacement takes place within the linear response range of about 100 µm, measurement is allowed to continue within the linear response range even if the initial bending value is slightly changed (the operating point is changed) owing to, for example, causes of manufacture and temperature changes. In proportion to the high sensitivity of the optical fiber, the size of the diaphragm per se can be saved. In the above measurement, an absolute value of pressure can be determined by being referenced to, for example, atmospheric pressure which the internal pressure takes when both of the intake and exhaust valves are released.

Figure 14:
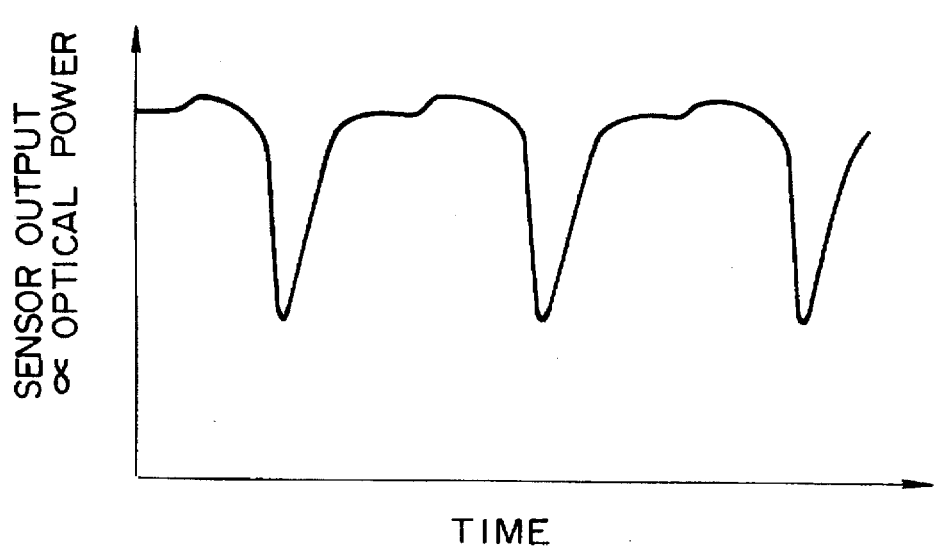
FIG. 14 is a graph showing an example of an output signal from the third embodiment of the cylinder internal pressure sensor according to the present invention (for one cylinder).

FIG. 14 diagrammatically shows an example of an output signal waveform (of one cylinder) from the optical fiber cylinder internal pressure sensor. The waveform shown in the Figure corresponds to an output signal waveform obtained in the case where the sensor block is packaged to only one cylinder. In this case, an increase (or decrease) in internal pressure is replaced by an increase (or decrease) in displacement of the diaphragm, that is, a decrease (or increase) in radius of curvature of the optical fiber and a decrease (or increase) in quantity of light passing through the optical fiber corresponding to the decrease (or increase) in radius of curvature of the optical fiber is captured. Accordingly, in comparison to the case of the ordinary internal pressure curve shown in FIG. 3, the peak to bottom relation is depicted upside down in FIG. 14.

Figure 15:
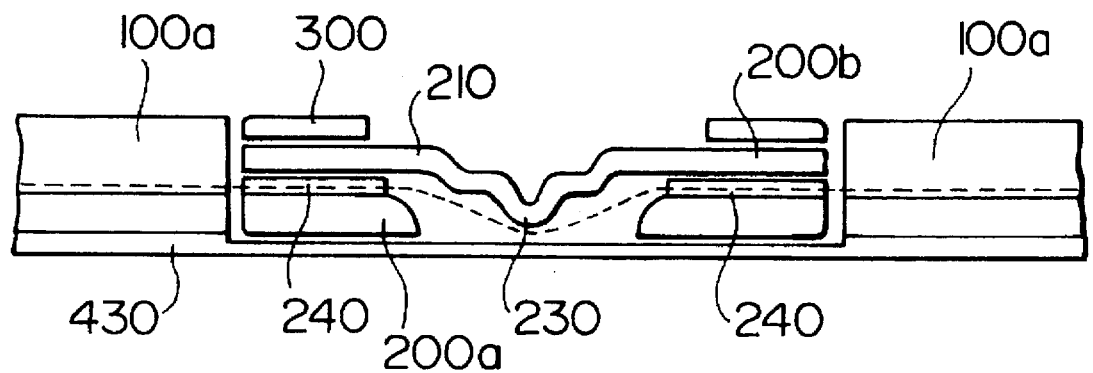
FIG. 15 is a sectional view showing an example of packaging of a sensor block to a gasket.

FIG. 15 shows, in sectional form, a different example of a construction of the sensing portion used in the third embodiment of the present invention. Generally, to make the diaphragm projection portion of FIG. 11, fine working such as electro-erosion machining is required. On the other hand, from the standpoint of productivity, it is desired to construct the diaphragm using a simpler working process. In FIG. 15, a sensor block upper portion 200b, a diaphragm 210 and a projection 230 of the diaphragm are formed by pressworking or stamping a metal plate having a thickness necessary for the diaphragm. In the Figure, the projection portion 230 is formed into two steps to permit the diaphragm to be displaced by a large amount, but the projecting amount and the shape of the projection can be changed as desired. A base portion 200a and seal means 300 of the sensor block can be constructed in a similar way. A groove 240 for the optical fiber can be formed by cutting the base portion using a wire saw, but it may also be formed by extrusion shaping during press working. Thus, by designing the sensor block such that it is divided into a base portion and a diaphragm portion in this manner, a method of manufacture highly suitable for mass-production, such as press working, can be utilized.

Of course, a method effective to achieve the objective of the present invention is not limited to press stamping. In the case where the shape becomes irregular owing to spring back of the nature of the material during the press working, an irregularity in the initial bending caused in the manufacture step can be reduced by mounting a projecting portion prepared separately onto the diaphragm plate. Utilized as the projecting portion in the above construction is, for example, a short segment formed by cutting a metal wire having a specified diameter.

During packaging, the internal pressure seal means 300 made of metal serves as means for radiating heat to the cylinder head. Also, in case a bottom plate of the gasket is made of metal and therefore, when the sensing portion is carried on a gasket bottom plate 430 (metal plate), the base portion 200a of the sensor block can also be utilized as means for radiating heat to the cylinder block as in the above case. Of course, a hole can be formed in the gasket to permit the base portion 200a to be carried directly on the cylinder block.

Figure 16:
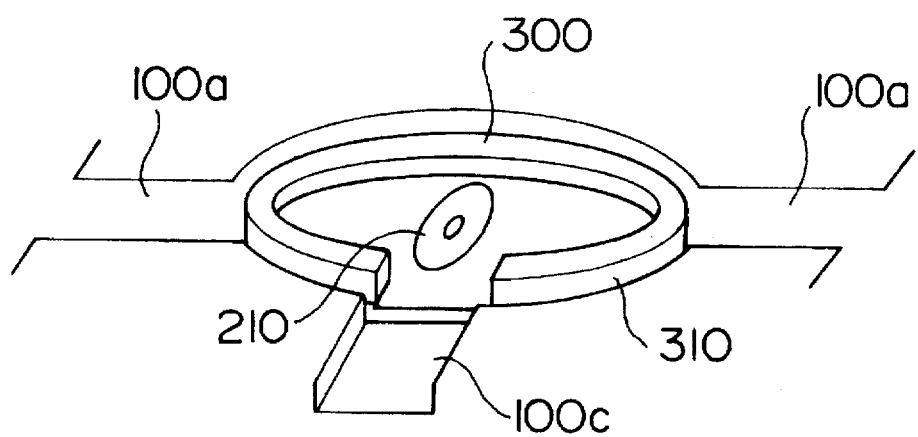
FIG. 16 is a diagram for explaining the external appearance of the example of packaging of a sensor block to a gasket.

FIG. 16 shows an external view, as seen from above, of the gasket constructed as shown in FIG. 15. On the presumption that press working is employed, the neighboring portion of the block exemplified herein is not square. When both the contour of the block neighboring portion and the contour of the block embedding portion are not of a true circle but are deformed into an elliptical form or an egg form, positioning of the fiber groove of the sensor block to the gasket groove 100a can be settled easily during mounting. In the Figure, a C-ring is used as the internal pressure seal means 300. The sensing portion is fixedly held in the gasket by means of resin 310 to maintain airtightness. Obviously, the sensing portion can be of a detachable type or plug-in type.

Figure 17:
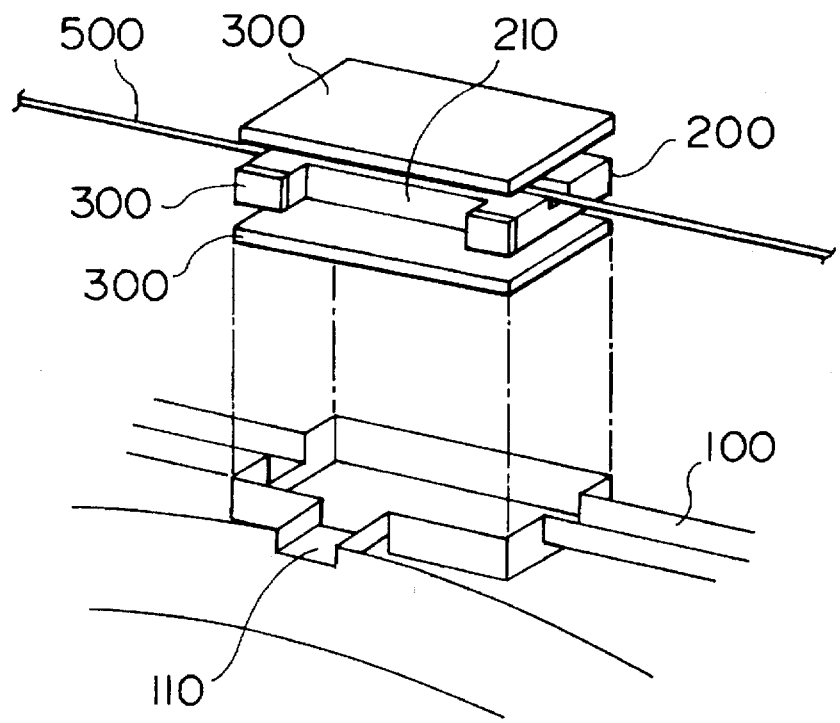
FIG. 17 shows an example of packaging of a sensor block in which an optical fiber is bent in parallel with a surface of a gasket.
Figure 18:
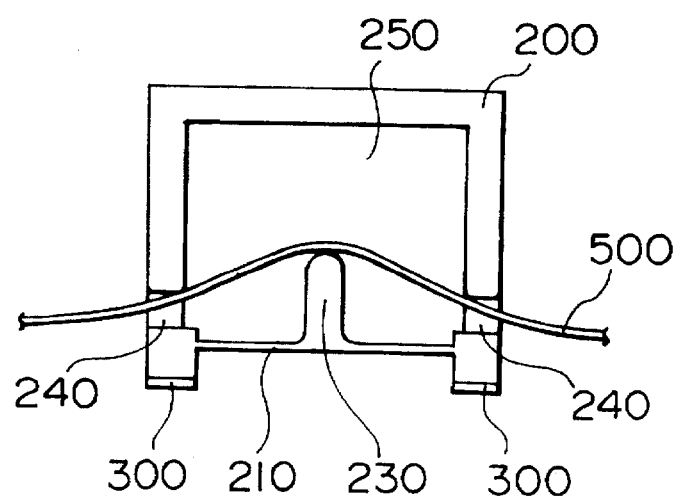
FIG. 18 is a sectional view showing an example of the sensor block in which an optical fiber is bent in parallel with a surface of a gasket.

The construction of the diaphragm 210 is not limited to the above but for example, the diaphragm may be constructed as shown in FIGS. 17 and 18 so that it is displaced in a direction parallel to the surface of the gasket. This is an example of packaging suitable for the case where the optical fiber is not allowed to undergo necessary initial bending in the direction of the thickness of the gasket or the case where the thickness of the gasket is large enough for the optical fiber to be mounted but is not large enough for the optical fiber to be bent sufficiently. As shown in FIG. 18 showing a sectional view of the sensing portion 200, a reference pressure space 250 can be expanded in a direction parallel to the surface of the gasket and therefore even when internal pressure leaks, its influence can in effect be avoided by increasing the volume of the reference pressure space 250 on condition that the amount of leakage is small. By taking advantage of this effect, a part or the whole of the internal pressure seal means 300 can be omitted.

Figure 19:
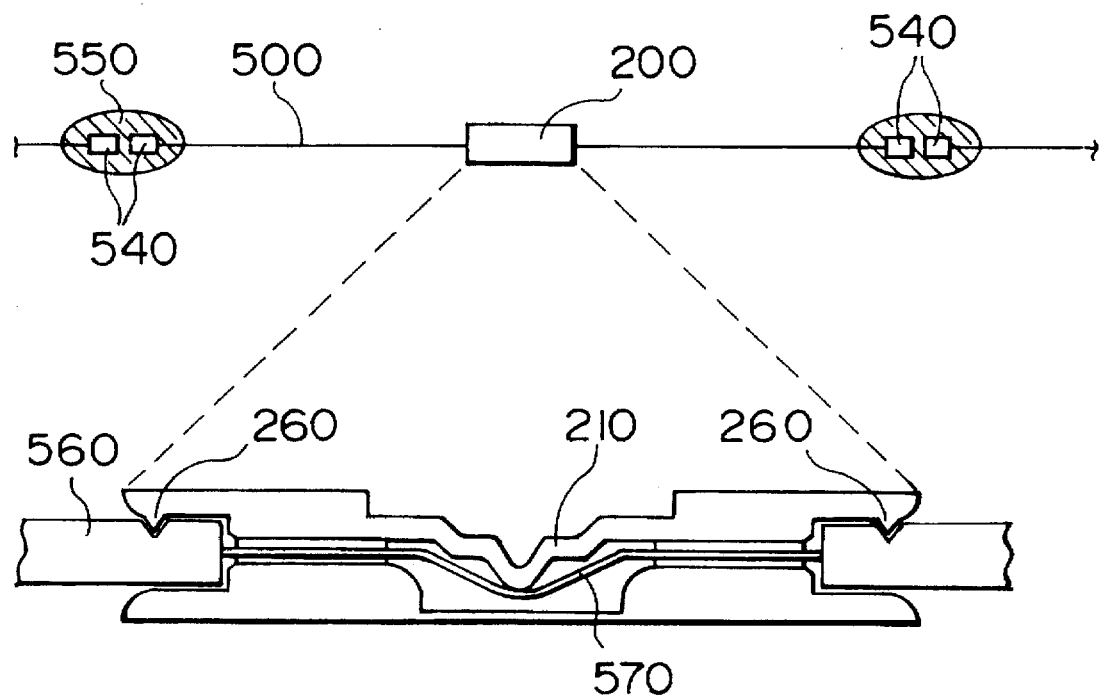
FIG. 19 is a diagram for explaining a sensor block module.

FIG. 19 shows an example where the sensor block and the optical fiber are unified into a module. An optical fiber 500 having an easy-to-handle length is initially built in a sensor block 200 and the optical fiber 500 is connected to an external optical fiber by using optical connectors 540 and their protective means 550 in combination. Usually, a fiber portion made of quartz glass of the optical fiber is covered with, for example, a nylon coat 560. In the Figure, a stopper cutting into the nylon coat 560 is utilized as fixing means 260. When the nylon coat 560 is pressed externally, the internal glass fiber will adversely be deformed, but by using, for example, a bonding agent of the type which dissolves the nylon coat 560 in combination, the stopper 260 can be held in place while dissolving the nylon coat in accordance with the shape of the stopper, and consequently no surplus deformation will take place. Alternatively, a suitable resin may be used alone for the optical fiber fixing means.

Preferably, an optical fiber 570 of the sensing portion is used with its nylon coat removed in consideration of response and size reduction. Typically, many types of optical fiber, when the nylon coat is removed, expose a further applied inner coat made of, for example, sintered silicone, but for protection of the glass fiber, a metal coat may additionally be applied by metal plating.

An ordinarily used connector for the optical fiber can be used as the connector 540 provided between the optical fibers. When the optical fiber used is a single mode optical fiber, the diameter of the optical fiber core is small, amounting to several microns, and under the circumstances, by enlarging the core diameter at the connecting portion through the use of, for example, a TEC technique which enlarges the core diameter by thermal diffusion, the tolerance to shift can be increased. Of course, when a multi-mode fiber, which is usable relatively easily for optical coupling, is designed to have a proper refractive index distribution that leads to a highly sensitive change of the optical power, the optical fiber of this type can also be used as the optical fiber for sensing. In an alternative, by selecting the wavelength of the light source and adjusting the number of modes of the propagating light, a tolerance to axial shifting of the optical coupling can be enhanced by virtue of the quantity of passing light.

When sensing portions are provided at a plurality of sites and packaging positions of the respective sensing portions are predetermined, all of the sensing portions can be unified into a single block or module.

Figure 20:
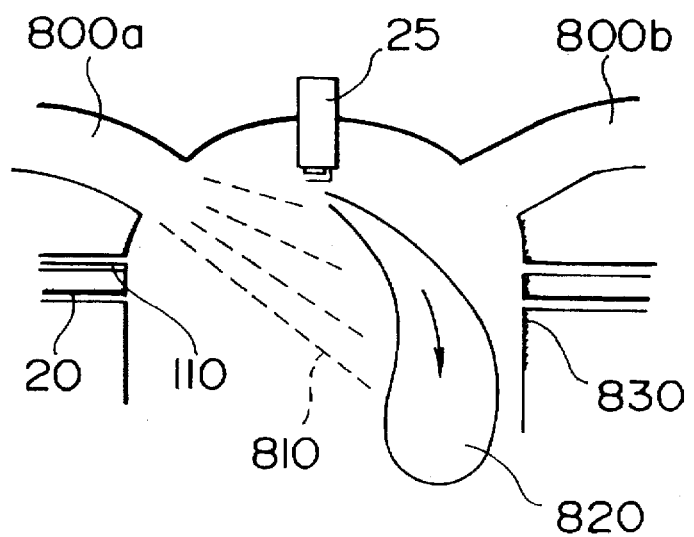
FIG. 20 is a diagram for explaining the arrangement of an internal pressure admitting port in a cylinder.

FIG. 20 diagrammatically shows, in sectional form, an example of a cylinder of an engine. In the Figure, fuel injected from an intake pipe 800a is ignited by an ignition plug 25 and flame moves as shown at 820. When a flow (swirl) of air is generated in the cylinder, movement 820 of flame is considered to be directed from the intake pipe 800a toward an exhaust pipe 800b as shown in the Figure. Because of the injection of fuel and the movement of a flame occurring in the directions mentioned above, a component 830, such as an unburnt component of fuel or soot stemming from an incomplete combustion state, is mainly deposited on the exhaust pipe and its neighborhood as shown in the Figure. An intake port 110 of combustion pressure can be designed so as to be positioned at any desired site on the inner peripheral wall of the cylinder from the viewpoint of packaging but it can advantageously be arranged on the semicircular periphery on the side of the intake manifold for the reasons set forth above in expectation of the fact that the influence of the deposition component 830 upon the inner peripheral wall is small at the internal pressure intake port 110. Through this, the internal pressure intake port can remain sufficiently clean even after long-term operation.

The sensor block need not always be formed of a metal member. For example, by working silicon through an isotropic etching, the base and diaphragm portions can also constructed with high accuracy. Further, the optical fiber can also be bent or curved in accordance with a method other than that of the three-point support. For example, when the diaphragm per se is so designed as to have a constant curvature R in sectional shape, more accurate initial bending (radius of curvature) than in the case of the three-point support can be obtained simply by fitting the optical fiber to the surface of the diagram.

Figure 21:
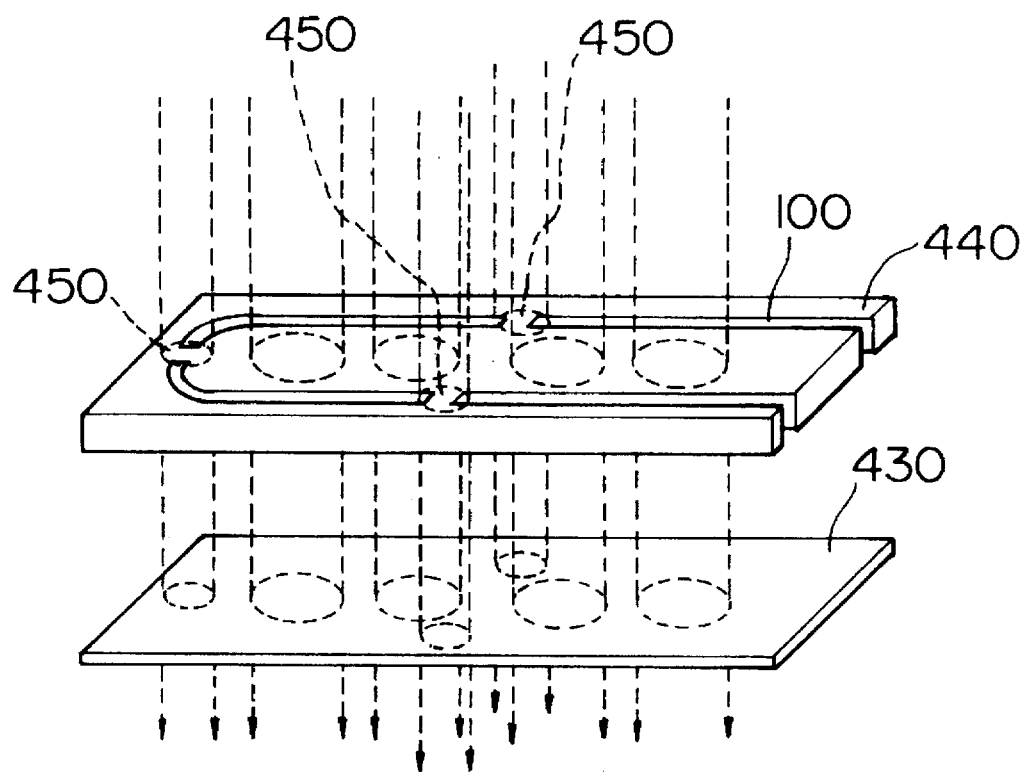
FIG. 21 is a diagram for explaining the construction of a groove in a laminar structure gasket.

FIG. 21 shows an example of the construction of the gasket groove. The groove can be formed by cutting the gasket surface by, for example, use of a drill, but as shown in the Figure, the groove can be formed by overlapping planar members to form a gasket per se and stamping the gasket. In the Figure, reference numeral 430 designates a gasket metal bottom plate and 440 a packing layer such as a carbon sheet. A groove portion is worked in accordance with the procedure described below. For formation of the gasket groove, i.e., a groove 100 for optical fiber installation as shown in the Figure, the packing layer 440 is stamped to provide a groove portion having temporary unstamped sections 450. The remaining temporary unstamped sections can make the handling of the gasket during work easy. The stamped packing layer 440 is mated with the metal bottom plate 430 and they are stamped to form cylinder holes, holes for bolts and holes for cooling water. At that time, the temporary unstamped sections 450 are also stamped to complete a continuous path for the optical fiber. If it is desired that the depth of the formed groove is to change with different sites, such an expanded modification can of course be accomplished easily by increasing the number of layers correspondingly. Finally, all of the layers are fixed to each other. For example, the metal bottom plate is protruded upwardly at necessary sites, the packing layer can be fixed to the metal plate by means of burrs thereof. When the depth of the groove is adjusted by using a plurality of layers, positions of the temporary unstamped sections 450 can be arranged to ensure that the temporary unstamped sections can be removed at a time during the final stamping step.

Figure 22:
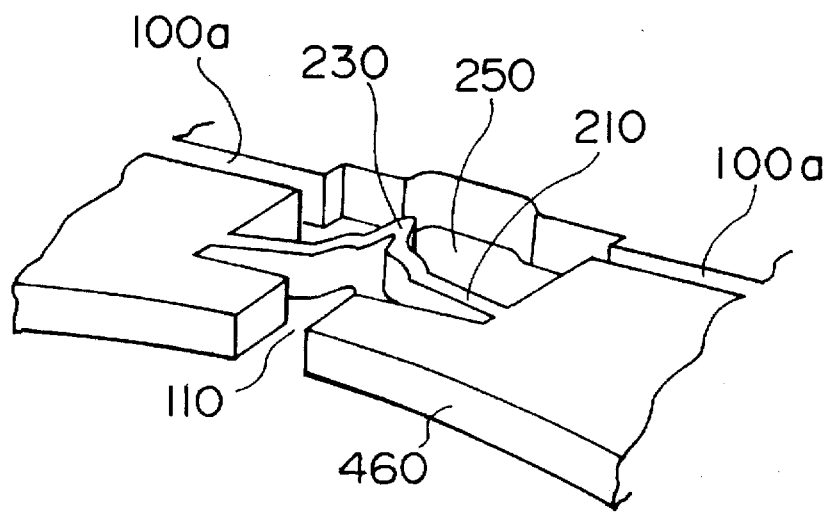
FIG. 22 is a diagram for explaining a method of constructing a sensing layer of the laminar structure gasket.

FIG. 22 shows an example in which an optical fiber embedding groove and a diaphragm structure are directly formed in one layer (sensing layer) of a gasket having the above layer structure. The sensing layer can be formed of a metal plate and a groove and a diaphragm can be formed at a time in the metal plate by photocomposing or photolithography. Alternatively, working such as stamping can also be utilized in compliance with necessary accuracy. Like FIG. 21, the optical fiber groove 100a is partly provided with temporary unstamped sections which are ultimately removed. An optical fiber for sensing is laid along the optical fiber embedding groove so as to be easily detachable. When an optical fiber for a reference signal is used in combination, a groove for this optical fiber can be prepared near the optical fiber for sensing in a similar way.

Figure 23:
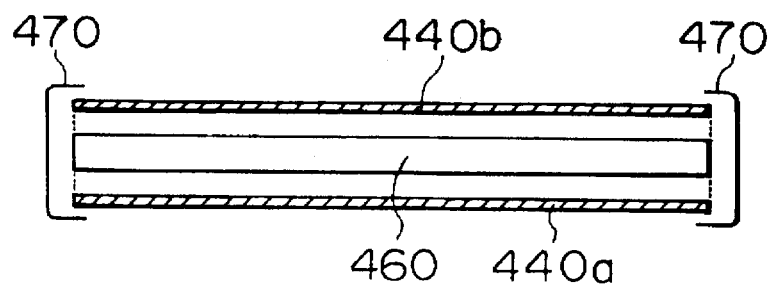
FIG. 23 is a diagram for explaining the whole construction, inclusive of the sensing layer, of the laminar structure gasket.

FIG. 23 shows an example of the construction of a gasket using the above sensing layer (metal plate). In the Figure, the sensing layer designated at 460 is sandwiched in between upper and lower packing layers 440a and 440b. The above three layers are mated with each other and stamped to form cylinder holes and holes for bolts and cooling water and to remove the temporary unstamped sections of the sensing layer. Thereafter, the gasket periphery and cylinder hole inner peripheral portions are covered, at necessary sites, with fixing means 470 to fix the layer-structure gasket. In originally designing a sensor built-in type gasket, the sensor built-in gasket can be constructed efficiently by using the above layer structure and the sensing layer in combination.

The construction of the sensing portion described hereinbefore in connection with the third embodiment of the present invention can be used in combination with the optical fiber cylinder internal pressure sensor optical systems of the first and second embodiments of the present invention. Advantageously, the present embodiment is immune to irregularity in clamping of bolts carried out during mounting of the gasket and the influence of the nature of gasket material and can make setting of the sensor sensitivity and the packaging easy.

[Fourth Embodiment]

Figure 24:
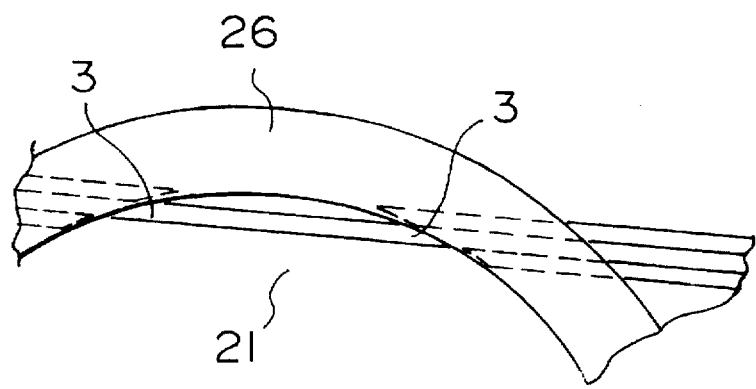
FIG. 24 shows an example of packaging of an optical fiber in a fourth embodiment of the cylinder internal pressure sensor according to the present invention.

FIG. 24 shows an embodiment in which the pressure transmission/application mechanism is omitted and the optical fiber for sensing is packaged directly in the cylinder. In the present embodiment, by taking advantage of the fact that the optical fiber has a fine diameter, connecting means such as a small hole is provided through which the gasket communicates with the interior of a cylinder 26. In this case, airtightness of the connecting means is maintained in expectation of a sensing operation by an optical fiber which can capture a difference between internal and external pressures generated near the inner peripheral wall of the cylinder in the form of a change in the amount of light. In the Figure, for convenience of illustration, the optical fiber 3 is depicted exaggeratedly so as to be spaced apart from the cylinder inner wall. Alternatively, the optical fiber may be packaged so as to slightly protrude from the cylinder inner wall. Denoted by 21 is the cylinder bore.

In practical engines, in order to mitigate shocks accompanying explosive combustion, the clamping bolts and the gasket are often contrived in various ways including, for example, plastic region clamping, but in a method as in the third and fourth embodiments of the present invention in which the engine constituting member is not utilized as the pressure transmission/application mechanism, compatibility of the packaging of the optical fiber cylinder internal pressure sensor with the existing engine technique can be ensured easily. Regardless of whether the clamping bolts and the gasket are utilized as the pressure transmission/ application mechanism or not, by adjusting the initial pressure applied to the optical fiber, pressures positive and negative relative to a reference state can be measured. Further, by using a signal 10c from the atmospheric pressure sensor in combination, an absolute value of pressure referenced to pressure prevailing when both of the intake and exhaust valves are opened can be measured. By using the above types of measurement in combination, engine control, for example, taking a negative pressure state during fuel suction into consideration can be carried out.

[Fifth Embodiment]

Figure 25:
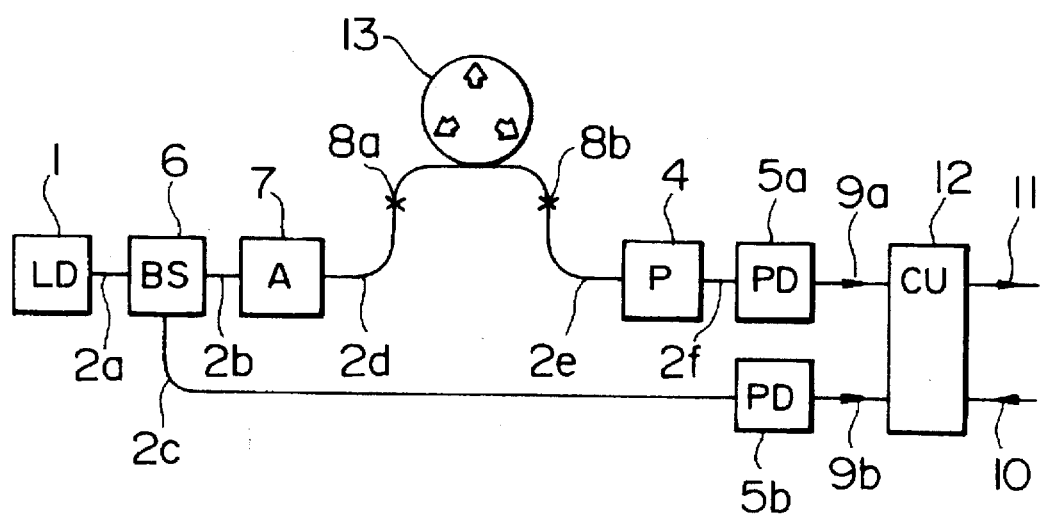
FIG. 25 is a diagram showing the construction of a fifth embodiment of the cylinder internal pressure sensor according to the present invention.

FIG. 25 shows a fifth embodiment of the present invention. By using a single mode optical fiber 13 coiled or looped up about a pressure sensing portion, a change in pressure applied in a radial direction of the optical fiber loop is captured in the form of a change in loop radius and a concomitant change in polarized state. The principle of pressure detection is the same as the fundamental principle of the fiber type polarization control device in which a single mode optical fiber is bent or curved into a loop of a constant radius to provide a difference in propagation constant between two independent polarization modes having polarization planes in a direction of a loop plane and in a direction vertical thereto, respectively. In the present embodiment, the loop radius per se is used as a sensing parameter. The fundamental principle of the fiber type polarization control device is explained in, for example, "Single- mode Fiber Fractional Wave Device and Polarization Controllers" by H. C. Lefevre, Electronics Letters Vol. 16, No. 20 (1980), 778.

Figure 26:
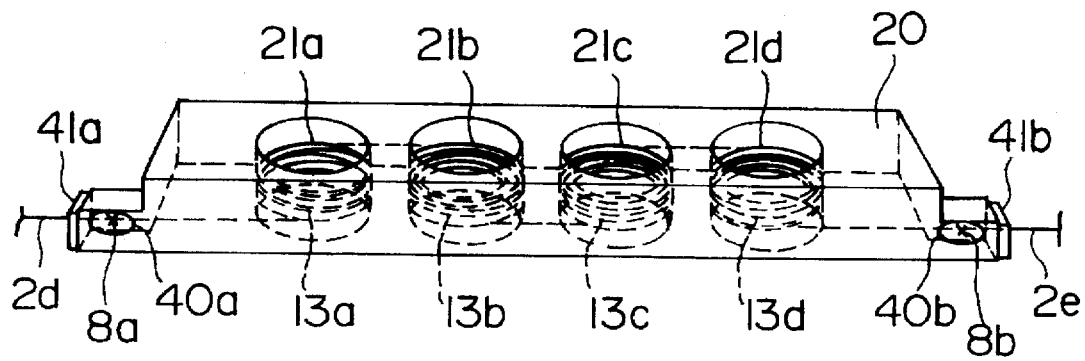
FIG. 26 shows an example of packaging of a cylinder coiling type optical fiber pressure sensing portion to a gasket.

FIG. 26 shows an example of packaging of the optical fiber to the gasket based on the present embodiment. In the Figure, by utilizing the fine diameter of the optical fiber and the direction of the gasket thickness, the fiber is coiled or looped up about an engine cylinder. With the existing gasket used, it cannot be expected that the number of turns is fairly large, but sensitivity can also be controlled by adjusting the thickness and material of a bore-grommet for transmission of internal pressure.

Figure 27:
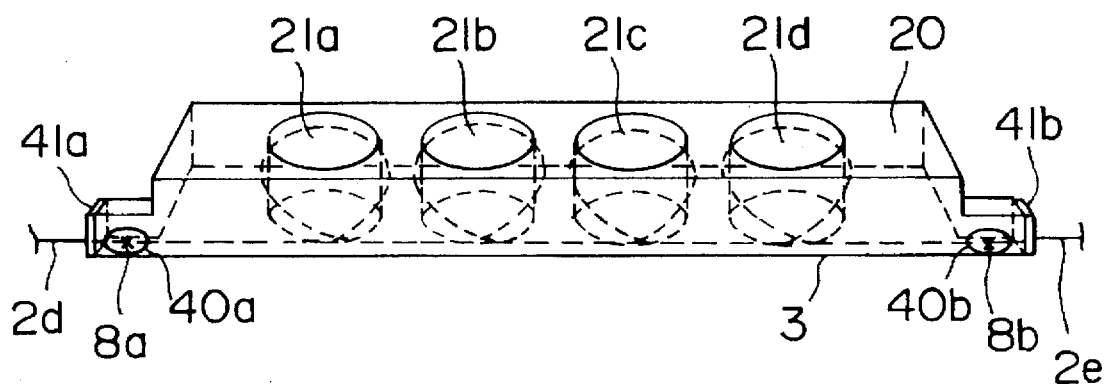
FIG. 27 shows an example of packaging of an optical fiber pressure sensing portion with tilted fiber-loops embedded in the gasket thickness.

FIG. 27 shows another example of packaging of an optical fiber utilizing the thickness direction of the engine gasket. When a sufficient displacement in the gasket thickness direction can be obtained in accordance with an increase or decrease in pressure due to clamping and explosion, a change in stress at portions of an optical fiber 3 and a change in spatial disposition of a fiber loop constructed of the optical fiber 3 (inclination of the loop plane) are expected to be detected. In this case, a change in polarized state based on ordinary operation of the fiber type polarization control device and pressure sensing based on the change in polarized state can be expected.

[Sixth Embodiment]

Figure 28:
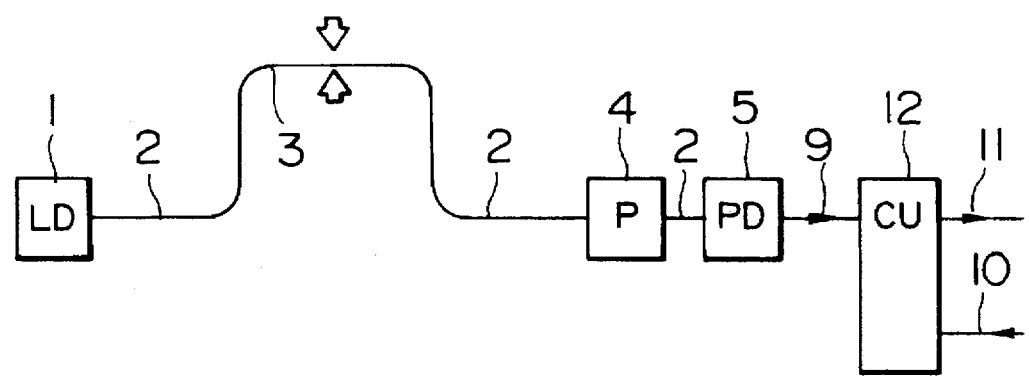
FIG. 28 is a diagram showing the construction of a sixth embodiment of the cylinder internal pressure sensor according to the present invention.

FIG. 28 shows a sixth embodiment of the present invention. In the present embodiment, a polarization light source is utilized and the second embodiment of the present invention is simplified. As an example, a laser diode having an anisotropic polarization dependence of light can be used as the light source. A linearly polarized light beam emitted from the laser diode 1 passes through an optical fiber 2 partly including a pressure sensing portion 3. A polarizer 4 selects a detected polarized component and a photodiode 5 detects light intensity of the selected component to provide a detection signal 9. Based on the detection signal and a reference signal 10 from another sensor, a sensor signal processor 12 transmits an output signal 11 for control. The measurement principle is the same as that of the second embodiment of the present invention. The pressure sensing portion can be used in combination with a pressure transmission/application mechanism. Essentially, an ordinary single mode optical fiber can be used as the optical fiber 2 or 3. As described hereinbefore, when a birefringent index fiber is utilized, a sensing which is less affected by disturbance can be ensured.

As described above, since in the present embodiment the incident polarized wave controller for controlling the polarization plane of output light from the light source is not used, the construction can be simplified to advantage.

[Seventh Embodiment]

Figure 29:
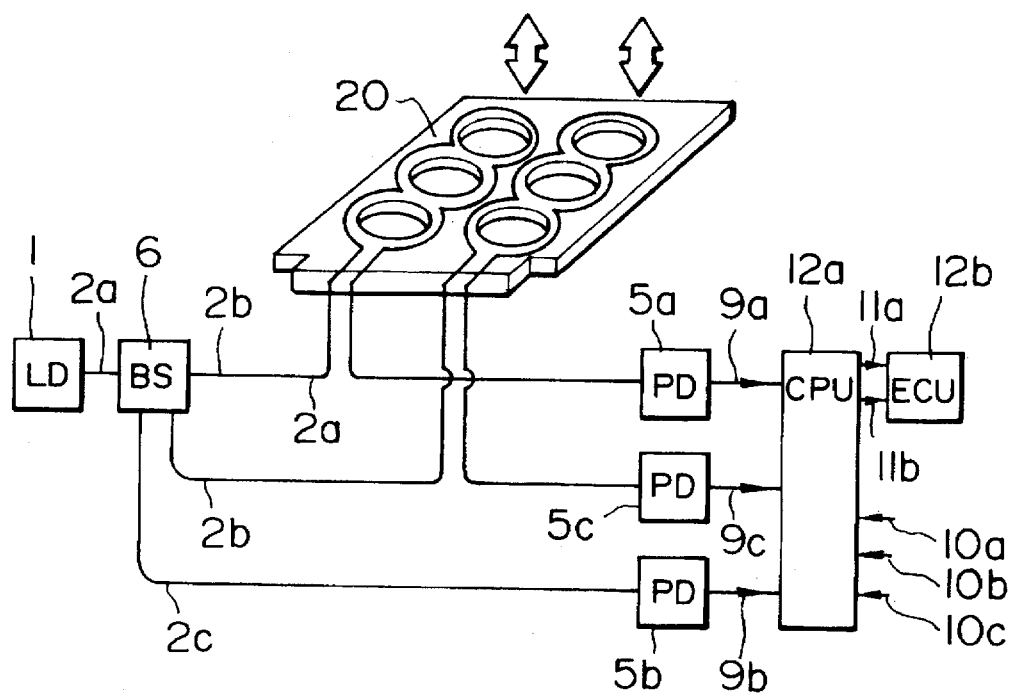
FIG. 29 is a diagram showing the construction of a seventh embodiment of the cylinder internal pressure sensor according to the present invention.

FIG. 29 shows a seventh embodiment of the present invention. In the present embodiment, two systems of optical fiber wiring are used to permit pressure to be detected without being affected by the time overlap of combustion cycles in the cylinder. A beam splitter 6 permits the use of a common light source 1 to thereby simplify light source power fluctuation control as compared to the case where a plurality of light sources are used. While in the Figure optical fiber wiring is laid for each block of three cylinders, the number of optical fiber wiring systems can be changed easily in compliance with the number of cylinders. In the alternative, independent wiring may be laid for each cylinder to carry out accurate measurement of internal pressure. Further, an optical fiber for compensating for a change in temperature or the like factor may be wired similarly to ensure a comparative processing of outputs. The pressure sensing portion can be constructed in various ways as described in connection with the foregoing embodiments.

According to the present embodiment, a plurality of optical fiber wiring systems are provided to make it easy to cope with a change in the sensing environment, such as the number of cylinders, and a change in conditions.

In the foregoing embodiments, the optical fiber is mounted on the engine gasket to ensure that the detection of the combustion state over all of a plurality of cylinders can be effected and that at the same time measurement of internal pressure of each cylinder can be carried out. On the other hand, the ignition plug is one of a few parts which can easily be mounted on and dismounted from the engine, and the interior or the vicinity of the ignition plug is an effective place at which to mount the optical fiber.

[Eighth Embodiment]

Figure 30:
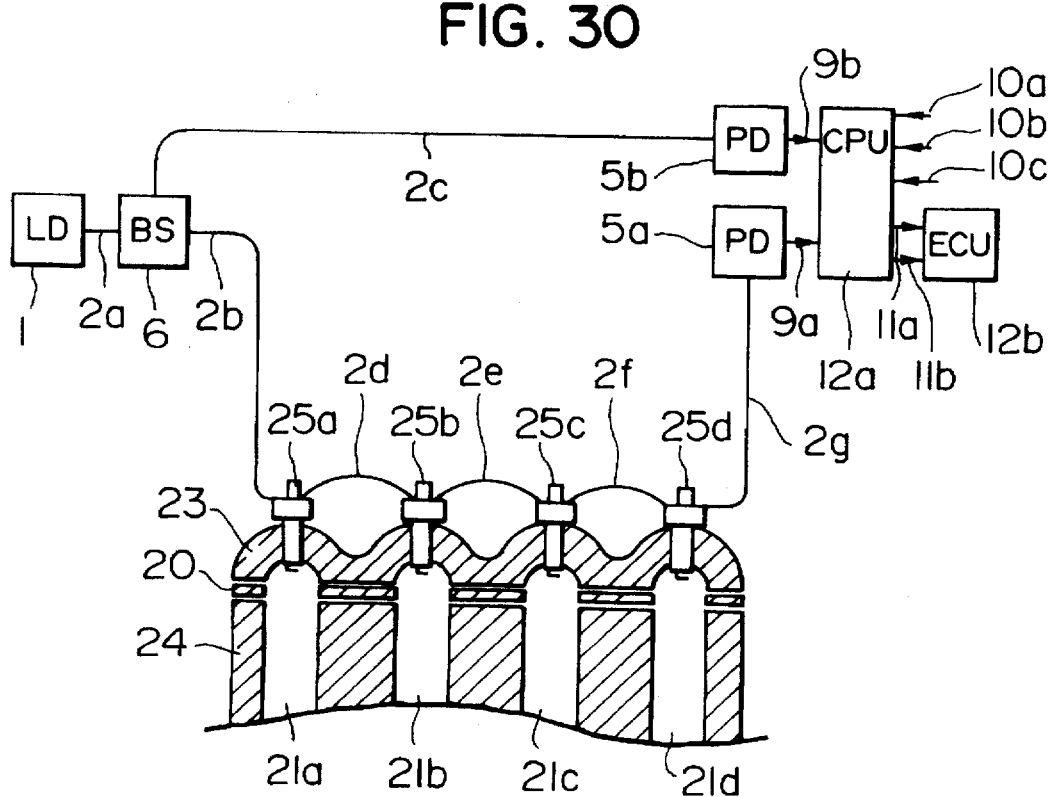
FIG. 30 is a diagram showing the construction of an eighth embodiment of the cylinder internal pressure sensor according to the present invention.

FIG. 30 is a diagram showing the overall construction of a cylinder internal pressure sensor in which optical fibers are packaged in series so as to be associated with cylinder ignition plugs 25a to 25d, respectively. Generally, in the series connection, a time division processing using optical fibers 2d to 2f for transmission, which interconnect sensors, as delay circuits can be used for signal processing. Here, gasket 20 is interposed between a cylinder block 24 and a cylinder head 23.

Figure 31:
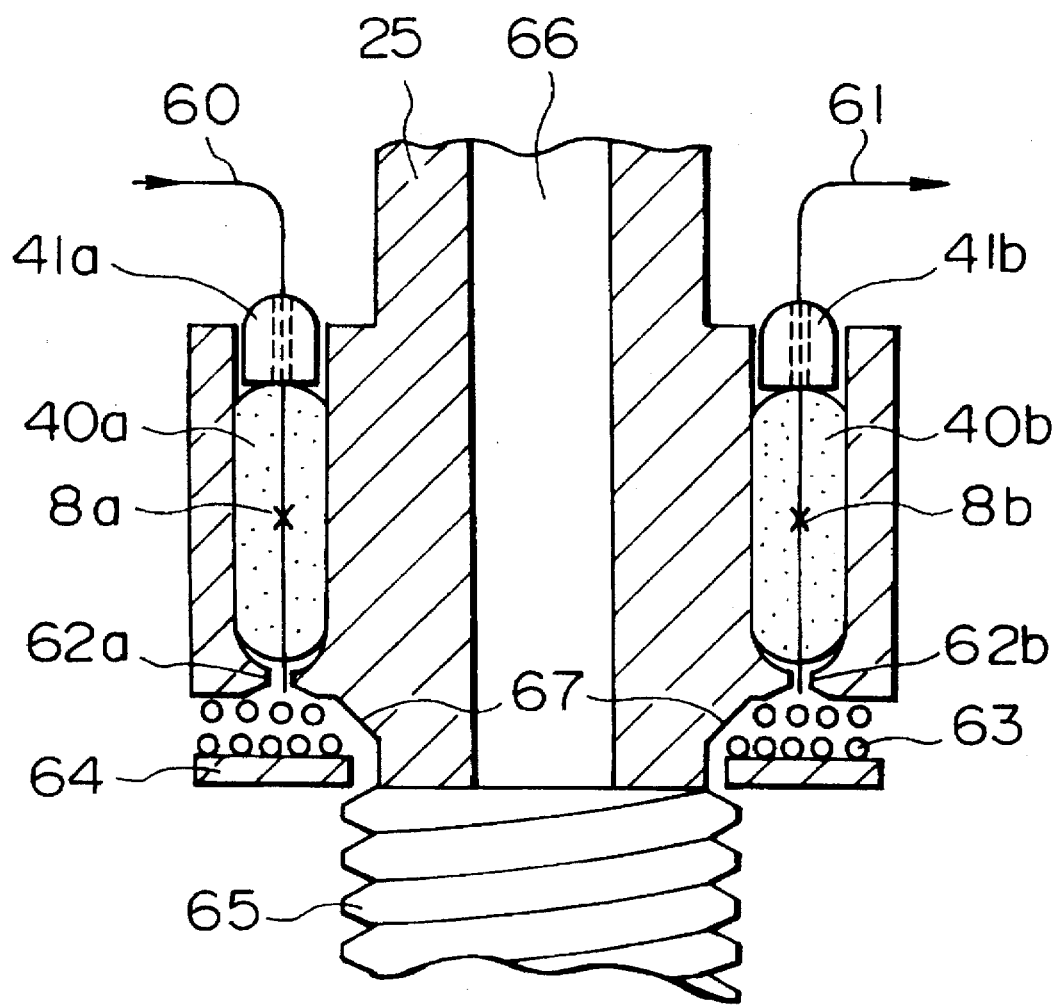
FIG. 31 is a sectional view of an ignition plug having an optical fiber for pressure and/or vibration detection at a seat portion.

FIG. 31 shows the construction of the packaging of the optical fiber to the ignition plug and a pressure application structure in the present embodiment. An optical fiber for transmission is led along an optical fiber take-in path 60 to the interior of a plug through an optical fiber protective cap 41a and then is connected to an optical fiber of the detecting portion. A connecting portion 8a is protected by a protective member 40a. The optical fiber passes through an optical fiber admitting hole 62a to reach a seat portion, is wound about the plug at the seat portion and thereafter is taken out of the plug through a route opposite to that for entering. Of course, the optical fiber take-in path 60 can be integral with a take-out path 61. The optical fiber wound about the seat is mounted on the engine through a washer 64 and detects a change in force generated in a direction vertical to the fiber loop plane by a change in vertical position of the plug accompanying combustion and by a mechanical displacement of the peripheral structure as well as vibrations (knocking). Openings, close to the seat, of the optical fiber admitting holes 62a and 62b are chamfered at a blunt angle to avoid damage of the optical fiber due to a bend caused when winding the optical fiber. The plug mount depth is adjusted by a length of a threaded portion 65 and an optical fiber protective structure 67 is provided on a shaft portion on which the optical fiber is wound in order to prevent the optical fiber from being broken by the washer having an excessive pressure applied thereto during mounting of the plug. When a birefringent index fiber is used for the sensing portion, the quantity of propagating light is reduced by winding per se of the fiber which is effected at a very small bending radius, but the number of turns of fiber winding can be adjusted suitably to one or less or a corresponding length because this type of fiber is highly sensitive to displacement. With the above hybrid construction incorporating a seat type knocking sensor and the optical fiber pressure detecting portion, sensing immune to electrical noise can be carried out by taking advantage of the characteristic of the seat type sensor.

The washer 64 used in the sensing portion may be provided with a pressure enhancing structure composed of, for example, a plurality of projections. When a washer with a pressure enhancing structure is used, a plurality of kinds of washers may be prepared which are different from each other in the shape of the pressure enhancing points and the number thereof, thus making it easy to change the sensor sensitivity.

The present embodiment has a simplified construction in which the optical fiber is wired at the seat portion of the ignition plug, which is easily mounted on and dismounted from the engine and attains the effect that a change in pressure in a plurality of cylinders and especially, the generation of knocking in the example of FIG. 31, can be detected efficiently.

[Ninth Embodiment]

Figure 32:
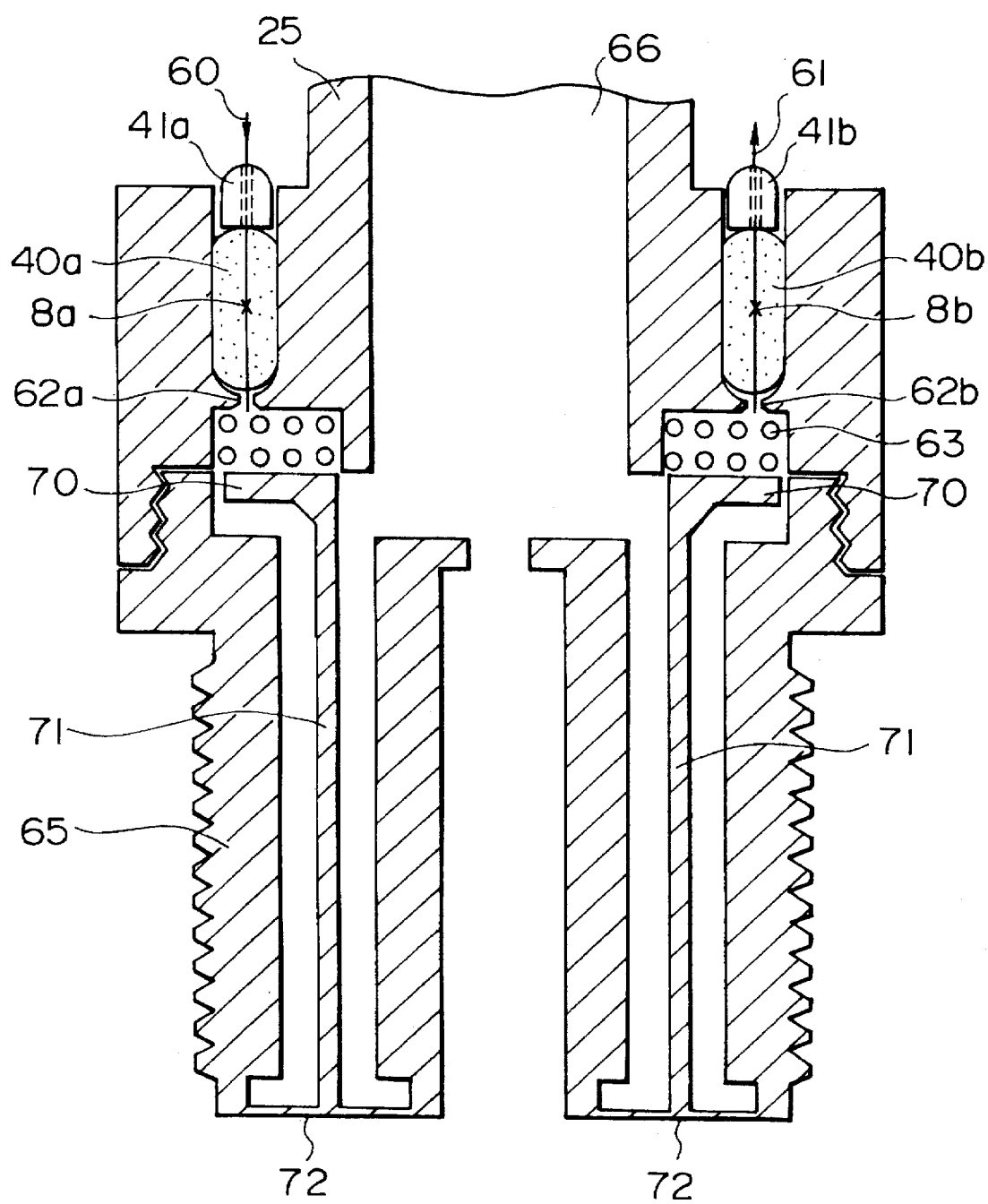
FIG. 32 is a sectional view showing an example of an optical fiber loop built-in type ignition plug which is a ninth embodiment of the cylinder internal pressure sensor according to the present invention.

FIG. 32 shows the construction in which an optical fiber loop for pressure detection is packaged in an ignition plug. The cylinder internal pressure is transmitted from a tip diaphragm 72 to an optical fiber for pressure detection through a pressure transmission mechanism 71 and a pressure application mechanism 70. Although not illustrated, a difference is set up between internal and external pressures under the condition that an electrode is built in the central portion of the ignition plug. In consideration of thermal deformation, the structure for transmission/application of pressure to the optical fiber is constructed so as to exhibit optimum sensitivity at, for example, a standard sensor operating temperature and a gradual temperature change from the operating temperature can be compensated by, for example, a temperature sensor. A sensor for reference, such as a temperature sensor, can also be formed of an optical fiber and can be incorporated in part of the optical system of the sensing system.

Figure 33:
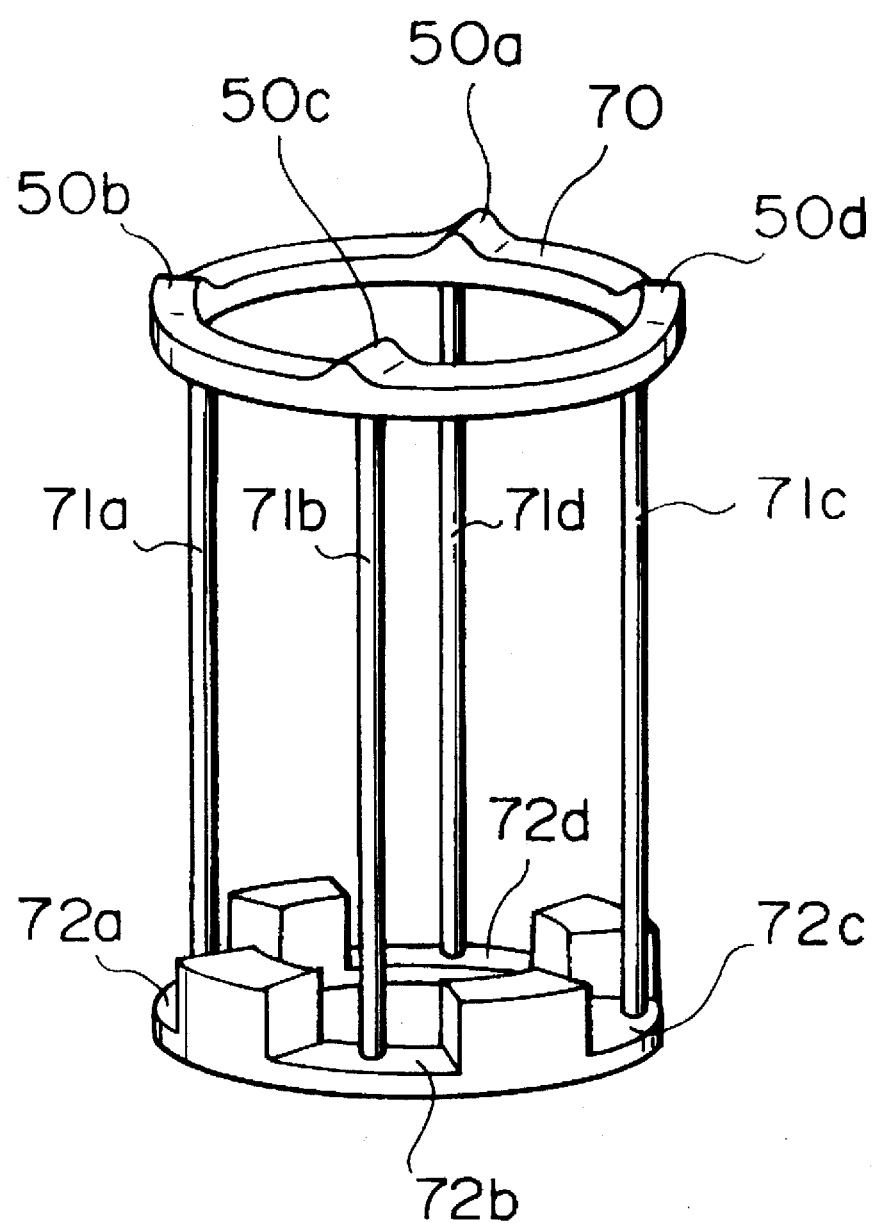
FIG. 33 shows an example of a pressure transmission/application structure for the optical fiber built-in type ignition plug.

FIG. 33 shows an example of the construction of the pressure transmission/application structure in the optical fiber built-in ignition plug of FIG. 32. Only a related part is extracted from FIG. 32 and depicted in FIG. 33. By adjusting the number of diaphragms 72a to 72d and the configuration of the pressure enhancing points 50a to 50d, sensitivity to a change in internal pressure can be adjusted. Thick portions respectively intervening between adjacent diaphragms constitute part of the plug body.

According to the present embodiment, by directly capturing a change in pressure by means of the pressure sensing portion diaphragms, internal pressure can advantageously be measured with high response and sensitivity. Denoted by 67 is a stopper which prevents the optical fiber from being damaged when the pressure application structure receives an excessive pressure.

[Tenth Embodiment]

Figure 34:
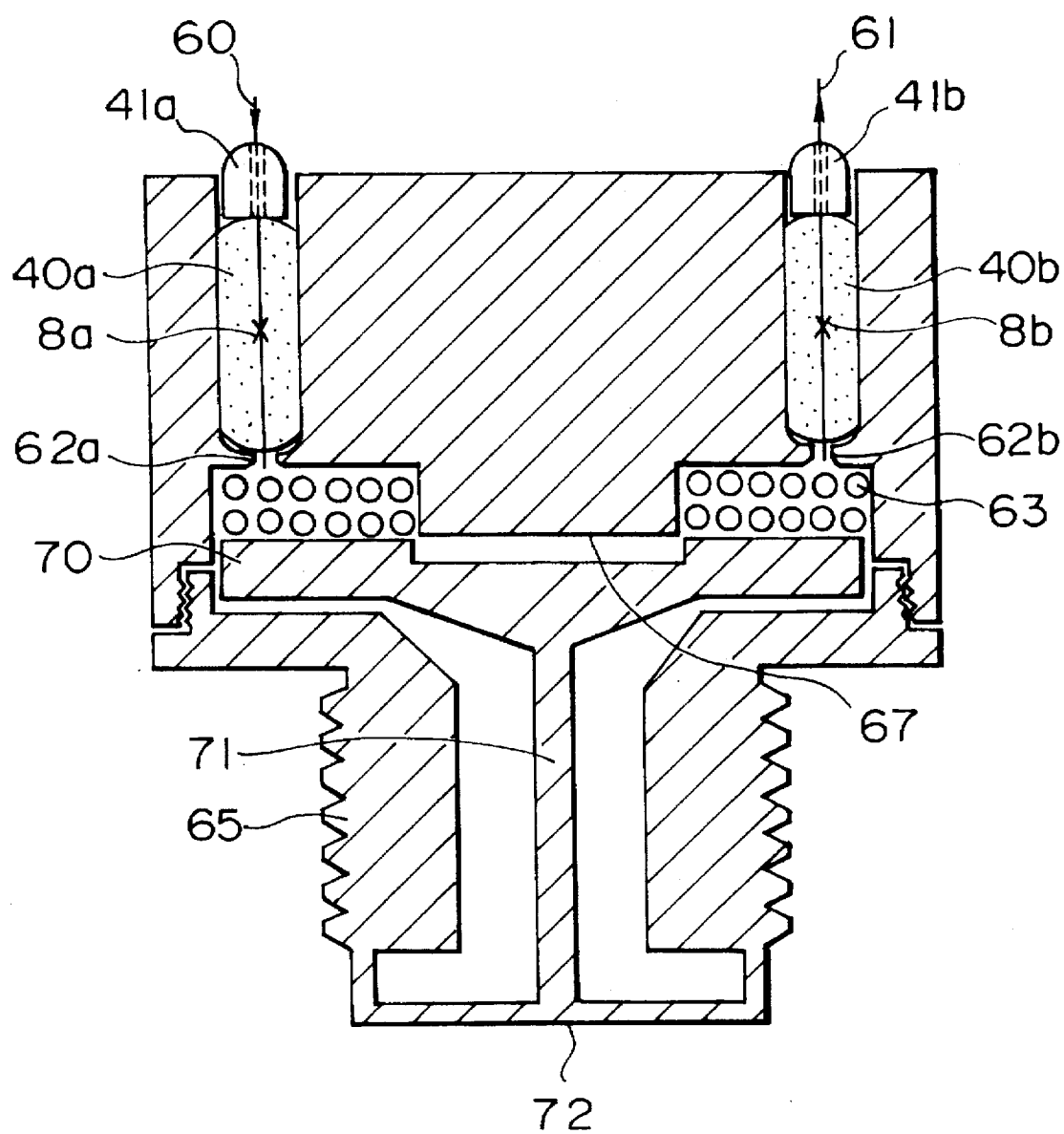
FIG. 34 shows a tenth embodiment of the cylinder internal pressure sensor according to the present invention (an attachable type optical fiber cylinder internal pressure detecting unit).

FIG. 34 shows an example of the construction of a sensing portion of ignition plug of the separate mount type. The separate mount type sensor per se encounters a problem in securing a mount location but the optical fiber cylinder internal pressure sensor has a freedom of packaging as structurally exemplified herein. Further, in comparison with conventional examples, sensing immune to electrical noise can be ensured.

[Eleventh Embodiment]

Figure 35:
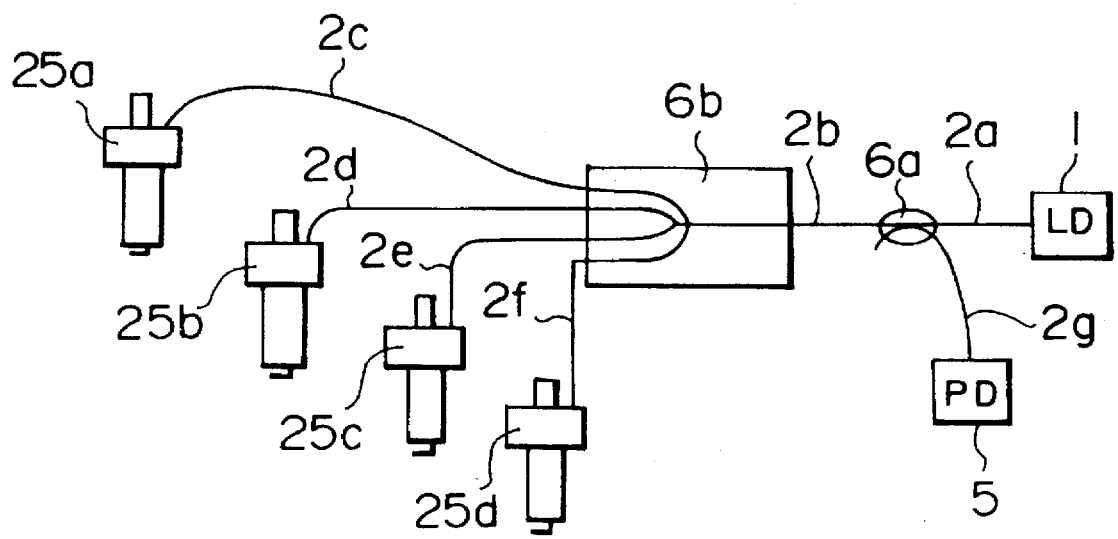
FIG. 35 is a diagram showing an eleventh embodiment of the cylinder internal pressure sensor according to the present invention.
Figure 36:
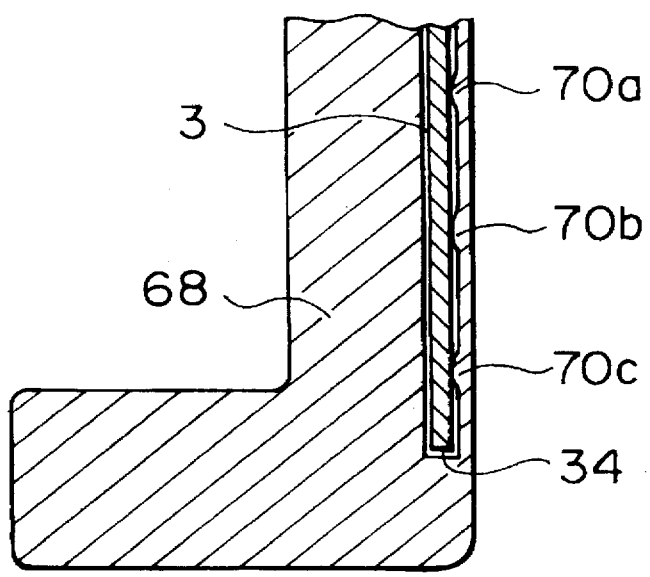
FIG. 36 is an enlarged view showing an example of packaging of an optical fiber to an ignition plug electrode.

FIG. 35 shows the overall construction of a cylinder internal pressure in which pressure detecting optical fibers are packaged in parallel to individual cylinder ignition plus. A light beam emitted from a light source 1 passes through optical splitting and coupling means 6a and is branched at optical splitting and coupling means 6b to optical fibers 2c, 2d, 2e and 2f connected to ignition plugs, respectively. The tip of each optical fiber is led to the interior of each ignition plug. FIG. 36 is an enlarged sectional view of an electrode portion showing an example of the case where the tip of the optical fiber is led to the interior of the ignition plug electrode. A tip portion 34 is treated through mirror polishing, metal vapor deposition or plating to have ability to efficiently reflect propagating light. Through this, a light beam propagating through the optical fiber reaches the optical fiber tip portion, is then reflected thereat and is again passed through the optical splitting and coupling means 6b and 6a so as to be detected by light receiving means 5.

In FIG. 36, reference numerals 70a, 70b and 70c designate means for applying pressure to the optical fiber. As described above, the optical fiber propagating light passes twice through the pressure applying means, but the propagating speed of light is far greater than the speed of any change in pressure to be detected and therefore the optical fiber undergoes twice an optical loss in response to an internal pressure within a specified time. Namely, within a range of linear response, the internal pressure can be measured with doubled sensitivity. Of course, the detection can be accomplished similarly by returning the optical fiber inside the ignition plug instead of reflecting light, but as has been described previously, when the optical fiber is bent at an excessively small bending radius, a decrease in the amount of light cannot be avoided. In the present embodiment, since the optical fiber need not be bent at a small radius, packaging is possible which can decrease the load on the sensing portion of the optical fiber.

Figure 37:
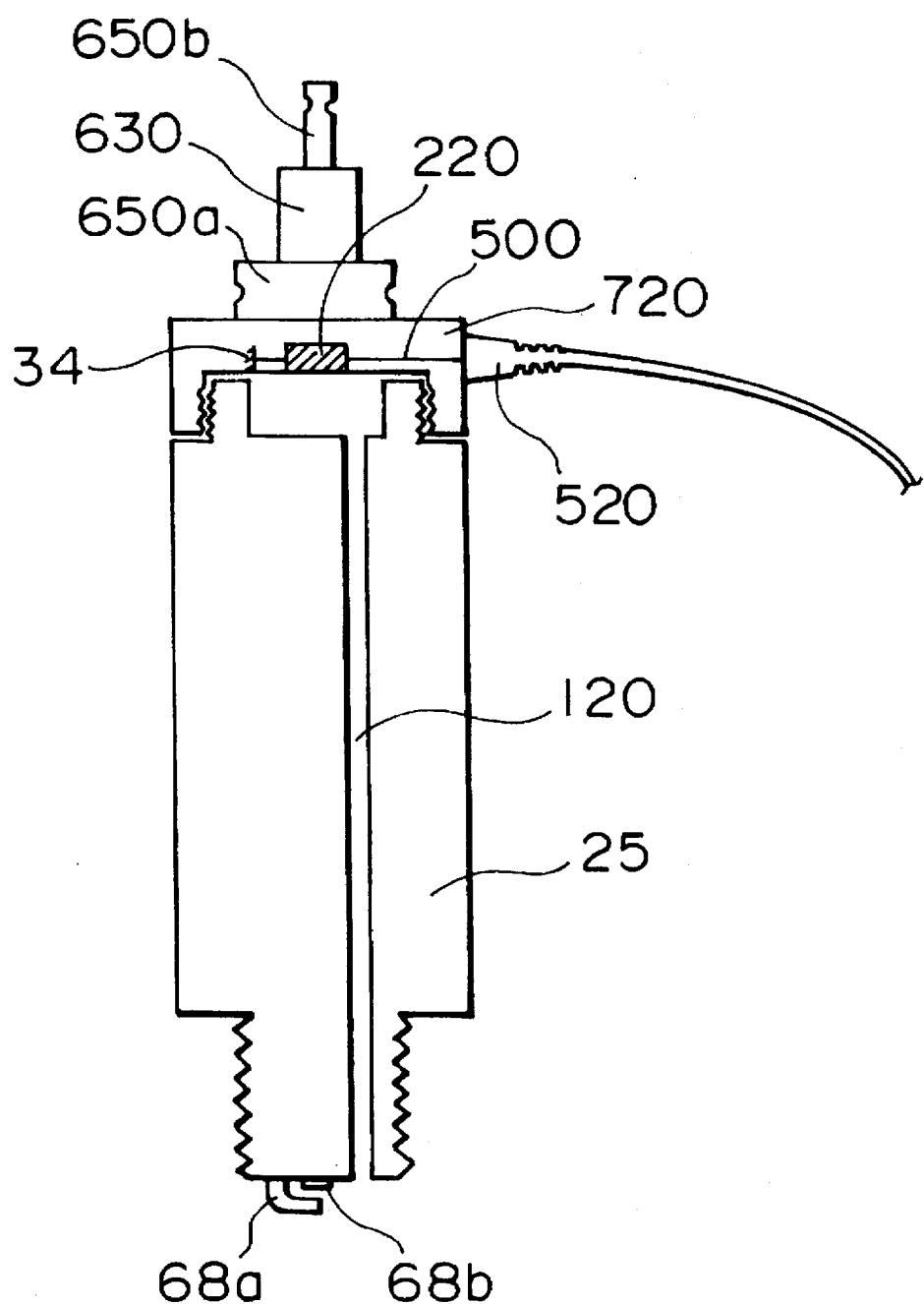
FIG. 37 is a diagram useful in explaining an instance where the third embodiment of the present invention is applied to an ignition plug.

FIG. 37 diagrammatically shows an example in which the third embodiment of the present invention is applied to an engine ignition plug. A sensing portion including a sensor block is arranged at a position 220 remote from the tip portion (fitting screw portion) of the ignition plug to measure an internal pressure admitted through an internal pressure admitting hole 120. In this case, the vicinity of the tip electrode of the ignition plug is only required to be worked so as to mainly open the internal pressure admitting hole 120. As the sensor block, the construction shown in FIGS. 9 and 17, for example, can be employed. The block is fixed such that the diaphragm portion is directed to reception of an internal pressure and applied with an internal pressure seal. For simplicity of illustration, the electrical connecting portion is omitted, but it is to be noted that when a cap portion (sensor cap) 720 including the block structure is mounted, electrodes 650a and 650b for external connection which sandwich insulating means 630 are electrically connected to tip electrodes 68a and 68b, respectively. In the Figure, the sensor cap 720 is screwed on the ignition plug 25 but, for example, plug-in connection may be employed between electrodes to obtain steady electrical connection.

Figure 38:
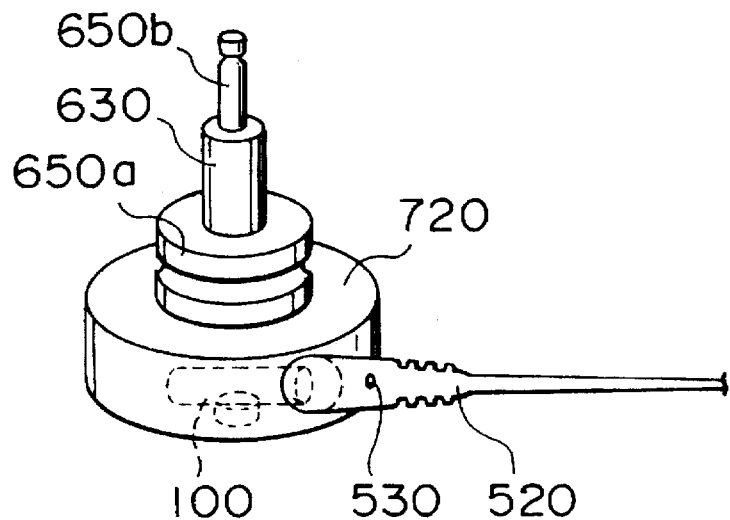
FIG. 38 is a diagram useful in explaining an example of the construction of a sensor cap.

FIG. 38 shows, in perspective view form, the whole of the sensor cap 720. Holes are formed in the side surface and bottom surface of the sensor cap to provide a cavity in which the sensing portion is embedded. The hole formed in the bottom surface serves as an internal pressure admitting port. An outlet opening, close to the sensor block, of the hole is applied with an internal pressure seal in compliance with the position of the diaphragm. The hole formed in the side surface serves as an insertion hole of the sensing portion including the sensor block, and after installation of the sensing portion, it serves as a path for optical fiber. The optical fiber passes through optical fiber protective means 520 and goes out of the sensor cap. When atmospheric pressure is used as a reference pressure for internal pressure measurement, an atmospheric pressure admitting hole 530 is formed in, for example, the optical fiber protective means 520 in expectation of the fact that, even when the internal pressure seal is not perfect, pressure prevailing in a space through which the optical fiber passes is always in communication with atmospheric pressure to mitigate the influence of leakage of internal pressure. While in the Figure the optical fiber is taken out vertically to the axis of the ignition plug, it can otherwise be taken out, for example, in parallel to the ignition plug axis by changing the direction of the sensor block. In that case, easy wiring of the optical fiber can be ensured even when the ignition plug is so designed as to be inserted and held in a recessed position from the standpoint of packaging.

According to the present embodiment, the optical fibers are wired in parallel and therefore even when a fault occurs in one detecting portion, the overall sensing function will not be lost immediately and an emergency measure can be taken flexibly to cope with various situations.

[Twelfth Embodiment]

Figure 39:
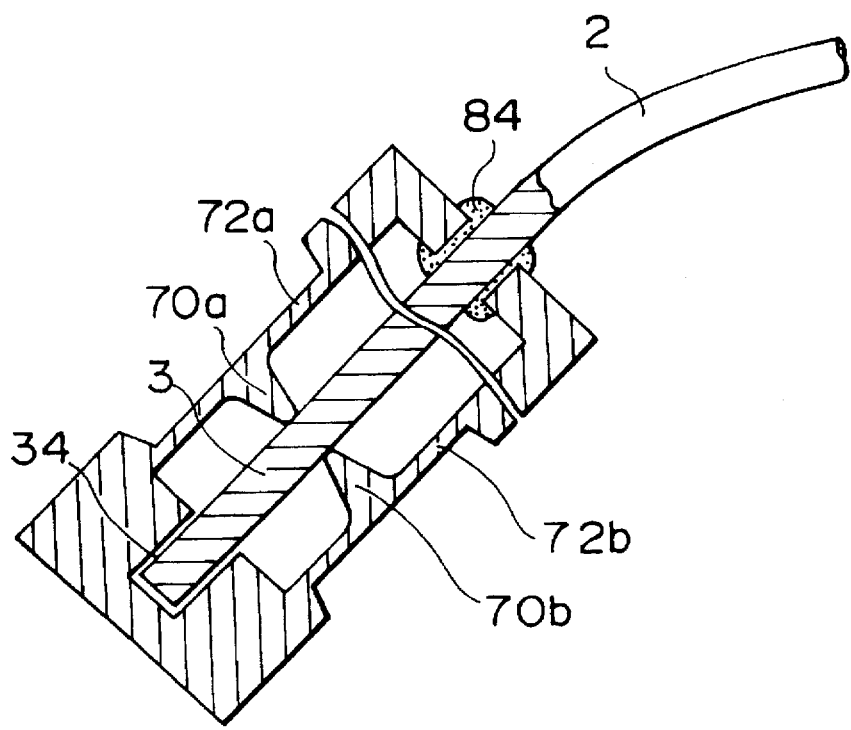
FIG. 39 shows an example of different construction of an optical fiber sensing portion having a pressure transmission/application mechanism.

FIG. 39 shows another embodiment of the optical sensor utilizing reflection from the end of an optical fiber. A light beam passing through an optical fiber 2 and reaching a sensing portion is reflected directly at a tip portion 34 and is caused to return along the path in the reverse direction. Denoted by 84 is a seal member for internal pressure, while 70a and 70b designate pressure application means and 72a and 72b designate pressure sensitive diaphragms. In an example shown in the Figure, "pressing" is applied to the optical fiber, but the position and shape of the pressure application means 70 can of course be changed to apply "bending" to the optical fiber and in general, pressure detecting sensitivity can be adjusted. With the optical fiber constructed as in the present embodiment, the size of the sensing part can be reduced sufficiently and hence a small measuring space formed in an object to be measured will suffice to permit measurement of environmental pressure.

Some embodiments of the engine cylinder internal pressure sensor have been described previously. Applications of the cylinder internal pressure sensor according to the present invention will now be described to make a total engine control system.

Figure 40:
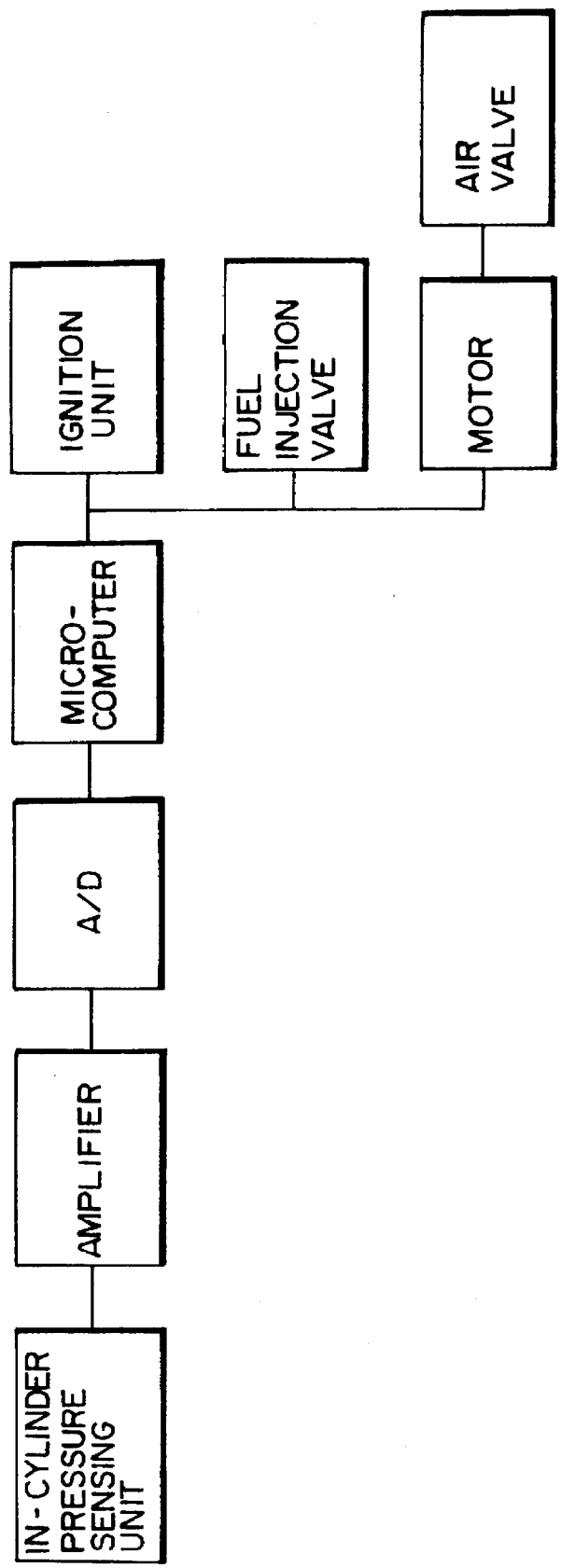
FIG. 40 is an example of a block diagram of an engine control system using the cylinder internal pressure sensor according to the present invention.

FIG. 40 is a block diagram of an engine control system using a cylinder internal pressure sensor. An output signal of the cylinder internal pressure sensor is amplified by an amplifier and then converted by an A/D converter (analog/digital converter) into a digital signal which in turn is inputted to a microcomputer. The microcomputer controls the operation of the ignition unit or the fuel injection valve or controls the operation of the air valve through the motor, thereby adjusting the ignition timing, the fuel amount and the air amount.

Figure 41:
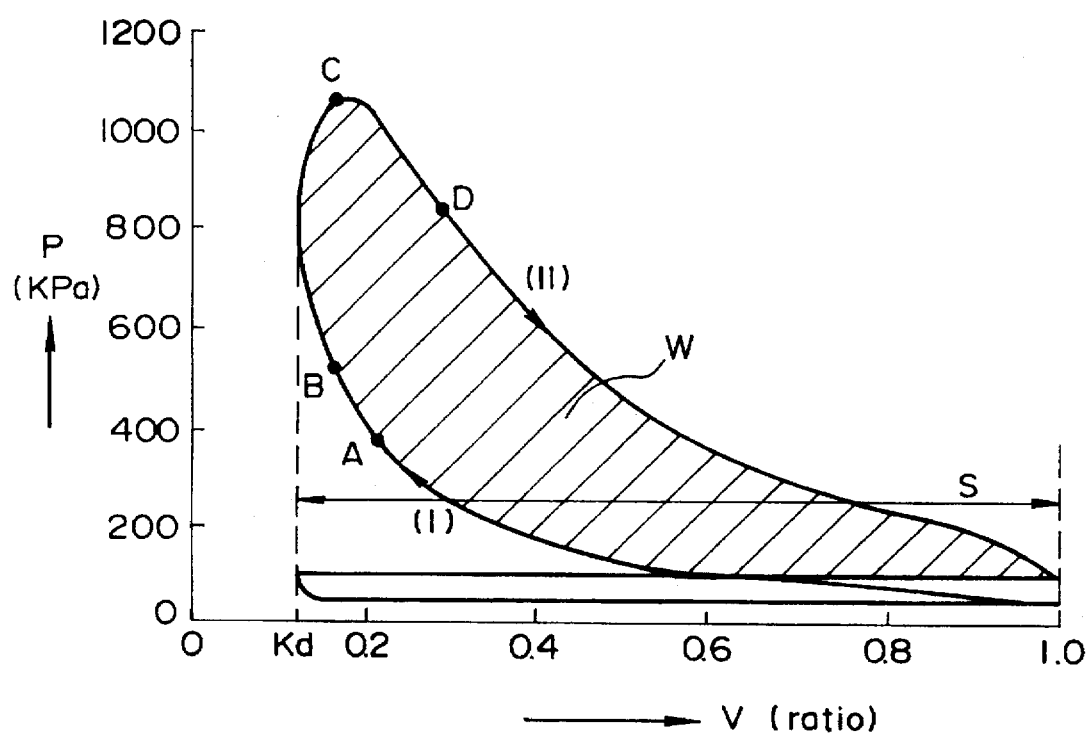
FIG. 41 shows an example of a P-V diagram in a one-cycle engine.

FIG. 41 is a graph showing a P-V (cylinder internal pressure-cylinder volume) diagram in one cycle of an engine. In the Figure, combustion, i.e., ignition starts at point A, rapid combustion proceeds at point B, the pressure reaches a maximum value at point C and combustion ends at point D. Namely, in the Figure, negative torque is generated in the arrow direction (I) and positive torque is generated in the arrow direction (II). Accordingly, the hatched area in the Figure corresponds to an effective work amount W in one cycle of the engine. By measuring a cylinder internal pressure accurately by means of a cylinder internal pressure sensor, an ignition timing, a fuel amount and an air amount which make the effective work amount maximum can be controlled. Even when only the maximum value of cylinder internal pressure is known, control for making the effective work amount W maximum can be effected because the maximum value is correlated to the engine output. Further, by capturing a high frequency signal component contained in the output of the cylinder internal pressure sensor according to the present invention as described previously, knocking can also be detected. In this case, a filter such as a band-pass filter or high-pass filter for passing only frequency components of a necessary band is provided to follow, for example, the amplifier of FIG. 40 and only an oscillatory component (mainly, high frequency component) accompanying knocking is inputted to the A/D converter. As detection of the knocking signal component begins to proceed, knocking can be prevented by controlling the ignition timing, for example. When the input signal is split, the above processing can of course be carried out in parallel to the detecting processing of all of the changes in internal pressure.

By utilizing internal pressure detection signals from a plurality of cylinders, the control described above can be effected in association with each cylinder. With the simplest construction using one optical fiber, the intensity of the light beam passing through the optical fiber, which light beam has passed through the respective detecting portions, indicates a change resulting from time-shift overlapping of changes in internal pressures in the respective cylinders as described previously since the combustion timing differs for each cylinder. In the present invention, the correspondence between each internal pressure peak and a cylinder presently in combustion state can be obtained easily by using the timing of, for example, the crank angle sensor or the ignition sensor provided at a specified cylinder as a reference and even when skirts of obtained internal pressure curves overlap with each other, engine control centered at the internal pressure maximum value can be performed easily. Also, on the basis of a change in the maximum value of the internal pressure curve, the generation of a misfire can be captured rapidly over all of the cylinders. When a result of misfire detection is. reflected in the engine control, there can be available, as an example, engine control in which lean combustion is maintained under a critical condition which does not affect driving.

Generally, even when a special combustion state partially begins to occur, it can be detected and controlled rapidly before it grows to spread over the whole engine by noticing the correspondence between the combustion state and a change in internal pressure. For detection of the combustion state, not only the whole of the output signal waveform and the magnitude of a specified frequency component can be noticed, but also their differential value, integral value and average value can be utilized.

A cylinder internal pressure sensor using an optical fiber is able to perform collective measurement within a wide area and at the same time to perform individual measurement in each partial area. The idea of the above measurement can also be applied to detection of other physical quantities in addition to the cylinder internal pressure measurement.

Figure 42:
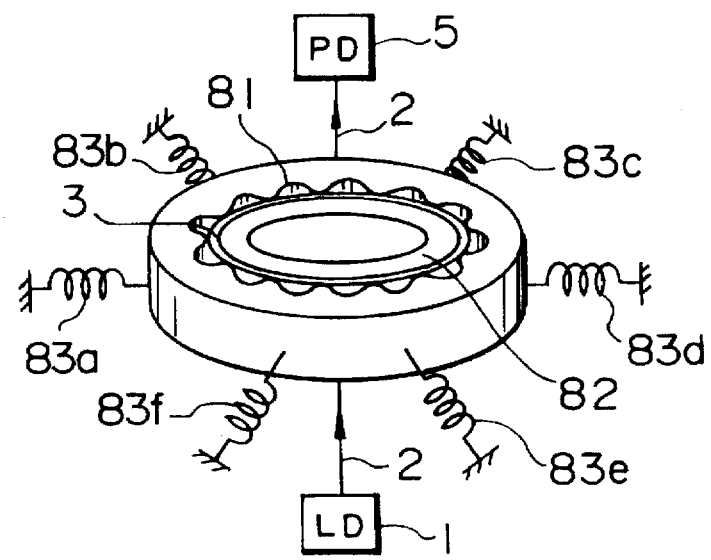
FIG. 42 shows the construction of a two-dimensional acceleration sensor.

FIG. 42 shows the construction of a two-dimensional acceleration sensor also using an optical fiber. A light beam emitted from a light source 1 passes through an optical fiber 2 and a fiber loop formed on an optical fiber winding ring 82 fixed horizontally and reaches light receiving means 5. Outside of the fiber winding ring surrounded by the optical fiber loop, a movable ring 81 having means for applying pressure to the optical fiber (an undulate structure in the Figure) is disposed, the pressure applying means having pressure applying members which are arranged angularly equidistantly. The movable ring 81 has a mass suitable for detection of acceleration and is balanced by support means 83a, 83b, 83c, 83d, 83e and 83f such as springs concentrically with the fiber winding ring when no acceleration is applied. Although not shown in FIG. 42, a support for allowing the movable ring to stably move in the horizontal plane may be used in combination, when needed. Under the application of acceleration in any direction in a plane containing the inner and outer rings, the movable ring presses part of the optical fiber and a change in the quantity of light propagating through the optical fiber occurs which depends on the magnitude of partial pressing. Through this, a change in acceleration in the two-dimensional plane can be captured rapidly regardless of the direction of acceleration. When a signal processing decision utilizing a specified threshold value is used, the present optical fiber sensor can be utilized as a collision detecting sensor or crush sensor for an air bag system having isotropic sensitivity in a 360° range.

Further, on the basis of an output signal from the light receiving means 5 and a signal from means for detecting the direction of acceleration or a location at which the optical fiber is subjected to a pressure by the movable ring, two-dimensional acceleration defined by the magnitude and direction can be detected. For detection of a site at which pressure is applied to the optical fiber, a resistance wire, for example, can be laid along the optical fiber and a movable ring made of an electrical conductor can be disposed such that a slight gap takes place between the resistance wire and the pressure applying means when no acceleration is applied. When acceleration is applied, the movable ring contacts the resistance wire and electrically conducts thereto to provide a resistance between one point on the resistance wire and the movable ring, that is, a resistance of the resistance wire between the one point and the contact position. Namely, the total resistance so obtained depends on the contact position or a site where pressure is applied to the optical fiber. By measuring this resistance, the pressure applied site can be known.

The aforementioned acceleration sensor converts acceleration applied to the sensor into a pressure applied to the optical fiber, whereby the acceleration can be captured from a change in propagating state of the optical fiber passing light due to the pressure. In the above method, a physical quantity applied to the apparatus is first converted into a pressure by physical quantity-pressure converting means and the pressure is applied to the optical fiber to detect the objective physical quantity over a wide range as described above and this method can also be applied to detection of other physical quantities. Taking temperature detection, for instance, a bimetal or shape memory alloy, for example, can be used as the temperature-pressure converting means.

Figure 43:
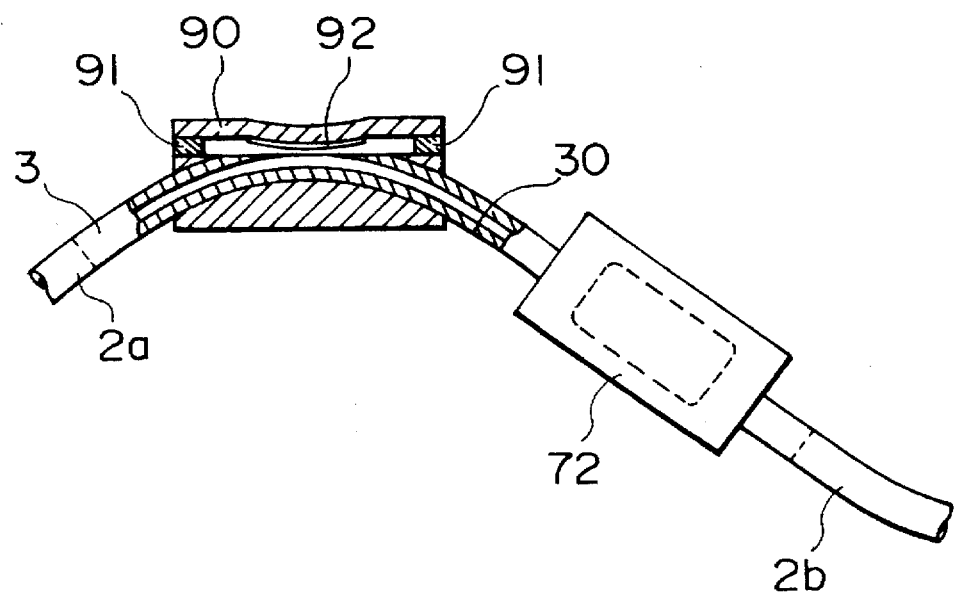
FIG. 43 shows an example of construction of a sensing portion when different physical quantities are detected in respective independent two polarized modes.

In the foregoing embodiments, the physical quantity is captured two-dimensionally or three-dimensionally but when the optical fiber is used as described below, different physical quantities can be measured by means of a single optical fiber. As an example, by using two respective independent polarization modes for sensing different or mutually independent physical quantities, the physical quantities can be detected and controlled versatilely. Exemplarily, FIG. 43 shows an example of the construction of the sensing portion used when temperature and pressure are measured simultaneously. In FIG. 43, respective sensing portions at two sites undergo changes in light intensity of mutually independent polarized components to measure changes in the physical quantities, respectively. More specifically, part of the optical fiber is polished and a polarized component vertical to the diaphragm surface is absorbed by an absorber made of, for example, metal. Since the magnitude of absorption changes with the distance between the absorber and the optical fiber, the absorber can be mounted on the physical quantity-pressure converting means so as to detect a change in the physical quantity in the form of a corresponding change in intensity of the polarized component. This operational principle is well known in the polishing type fiber polarizer and a pressure sensor based on that operational principle has already been proposed. In FIG. 43, reference numeral 72 designates a diaphragm portion of the pressure sensor. On the other hand, in a sensing portion structure shown in sectional form, the diaphragm 72 is replaced with temperature-pressure converting means 90. Therefore, the amount of light of one of mutually independent polarized components can be changed by a change in pressure and the amount of light of the other polarized component can be changed by a change in temperature and hence, by capturing a change, with time, in intensity of each polarized component, changes and fluctuations of the pressure and temperature can be detected. Each polarized component can be detected by using polarization/separation means such as a polarization beam splitter or an optical device for switching transmissive polarized components on a time division basis. Since, in a measurement detecting polarized components, a fluctuation in a polarized wave occurring at a portion other than the sensing portion must be avoided, and it is effective to use a polarization-maintaining fiber standing for a birefringent index fiber as the optical transmission path 2a or 2b and mount the diaphragm portion in compliance with the direction of the polarization maintaining axis. For the same reasons, a polarization fluctuation can be prevented similarly from occurring in the optical fiber interconnecting the two when physical quantity measuring positions are remote from each other. In the present case, the physical quantity-pressure converting means does not push or bend the optical fiber, but utilizing a proper bend or press of the optical fiber is, of course, available.

As described above, in various types of sensors, the detecting portions are all formed of an optical fiber. Accordingly, optical system constituent members, such as the light source and the optical fiber cable for communication, can be used in common for different sensors and measurement results of the sensors can be utilized efficiently by a common information processor to perform versatile analytical control. Through this, a collective sensing system for a mobile vehicle, such as a car can be constructed.

As will be seen from the foregoing, measurement according to the present invention is of the analog sensing type based on a change in the amount of light but when a pressure transmission/application structure having upper and lower limits of, for example, significant response is provided at one or more sites and a physical quantity-stress converting mechanism is used in which the number of sites where a change in the amount of propagating light gradually increases as the physical quantity changes, changes in objective physical quantities can be detected and processed discretely by measuring the number of sites where the amount of light changes, thereby permitting the construction of a sensing system in which stability and reproducibility of measurement are increased.

According to the present invention, with an apparatus of simplified construction, the states of physical quantities can be detected rapidly over the whole of a wide area and at the same time the physical quantity in individual partial areas can also be detected. Further, a physical quantity detecting apparatus can advantageously be provided which can detect multiple components, such as a vectorial physical quantity having a plurality of, two-dimensional or three-dimensional, components or a plurality of different physical quantities.

We claim:

1. A physical quantity detecting apparatus utilizing an optical fiber for detecting an operating condition of an engine, comprising:
   at least one birefringent optical fiber;
   at least one light emitting means for emitting incident light beam on said optical fiber;
   at least one light receiving means for detecting the light power of an outgoing light beam from said optical fiber;
   physical quantity applying means for bending said optical fiber on the basis of a plurality of physical quantities to be measured so as to change the power of light passing through said optical fiber, wherein said physical quantity applying means is packaged in a member forming part of an engine; and
   means for detecting said physical quantity from the light power detected by said light receiving means.

2. A physical quantity detecting apparatus utilizing an optical fiber according to claim 1, wherein said engine member is a gasket.

3. A physical quantity detecting apparatus utilizing an optical fiber according to claim 1, wherein said engine member is an ignition plug.

4. A physical quantity detecting apparatus utilizing an optical fiber according to claim 1, further comprising means for prestressing said optical fiber at least at the location of said physical quantity applying means to preset the level of the power of light detected by said detecting means to a predetermined level in the absence of application of stress to said optical fiber due to said physical quantities.

5. A physical quantity detecting apparatus utilizing an optical fiber according to claim 4, wherein said prestressing means forms part of said physical quantity applying means.

6. A physical quantity detecting apparatus utilizing an optical fiber according to claim 4, wherein said prestressing means forms part of said engine.

7. A physical quantity detecting apparatus utilizing an optical fiber, comprising:
   at least one optical fiber;
   at least one light emitting means for emitting an incident light beam on said optical fiber;
   at least one light receiving means for detecting an outgoing light beam from said optical fiber;
   physical quantity applying means for applying stress to said optical fiber on the basis of a plurality of physical quantities to be measured so as to change characteristics of the light passing through said optical fiber;
   position information generating means for generating a position reference signal, independent of an output of said light receiving means, concerning positions at which said plurality of physical quantities to be measured are applied to said optical fiber; and
   operation means for detecting at least one physical quantity of said plurality of physical quantities on the basis of a detection signal from said light receiving means and the position reference signal from said position information generating means.

8. A physical quantity detecting apparatus according to claim 7 wherein at least part of said optical fiber is a birefringent index optical fiber.

9. A physical quantity detecting apparatus according to claim 8, wherein said birefringent index optical fiber has a cross-sectional structure which causes the distribution of refractive index the fiber to be asymmetrical to the axis thereof.

10. A physical quantity detecting apparatus according to claim 8 wherein said birefringent index optical fiber is a polarization plane conserving optical fiber.

11. A physical quantity detecting apparatus according to claim 7 wherein said optical fiber is a single mode optical fiber.

12. A physical quantity detecting apparatus according to claim 7 wherein said optical fiber is a multi-mode optical fiber.

13. A physical quantity detecting apparatus according to claim 7 further comprising:

means, interposed between said light emitting means and said optical fiber, for performing polarization control of the incident light beam on said optical fiber; and a polarizer interposed between said optical fiber and said light receiving means.

14. A physical quantity detecting apparatus according to claim 13 wherein said polarization control means comprises means for providing a plurality of polarized components;

said physical quantity applying means comprises means responsive to at least one of said plurality of physical quantities for changing optical characteristics of each of said plurality of polarized components; and said polarizer comprises said means for detecting at least said one polarized component of said plurality of polarized components.

15. A physical quantity detecting apparatus according to claim 7 wherein said light emitting means is a light source for emitting a light beam containing a plurality of polarized components;

said physical quantity applying means comprises means responsive to at least one necessary physical quantity of said plurality of physical quantities to change optical characteristics of at least said one of said plurality of polarized components; and said light receiving means has means for detecting a polarized component undergoing a change in optical characteristics.

16. A physical quantity detecting apparatus according to claim 7 wherein said physical quantity applying means comprises means for applying said plurality of physical quantities to a plurality of positions on said one optical fiber.

17. A physical quantity detecting apparatus according to claim 16 wherein part of said optical fiber is used as a delay circuit, and said operation means includes means for processing a signal from said light receiving means on a time-division basis.

18. A physical quantity detecting apparatus according to claim 7 having a plurality of optical fibers;

wherein said light emitting means has means for admitting a light beam to each of said plurality of optical fibers;

said physical quantity applying means comprises means for applying at least one physical quantity to each optical fiber; and said light receiving means has means for detecting light beams from said plurality of optical fibers.

19. A physical quantity detecting apparatus according to claim 18 wherein said light receiving means includes light beam detecting means provided in association with each of said plurality of optical fibers.

20. A physical quantity detecting apparatus according to claim 18 wherein said light admitting means is a beam splitter for splitting a light beam received from one light emitting means.

21. A physical quantity detecting apparatus according to claim 5 wherein said optical fiber has a tip formed in a reflection surface.

22. A physical quantity detecting apparatus according to claim 21 further comprising light splitting and coupling means, interposed between said light emitting means and said optical fiber, for admitting a reflection beam from said tip to said light receiving means.

23. A physical quantity detecting apparatus according to claim 7 wherein said physical quantity is pressure or a quantity to be converted into a pressure.

24. A physical quantity detecting apparatus according to claim 23 wherein said physical quantity applying means has a pressure transmitting medium for transmitting a pressure to said optical fiber.

25. A physical quantity detecting apparatus according to claim 24 wherein said pressure transmitting medium has a diaphragm responsive to pressure to transmit its movement to said optical fiber.

26. A physical quantity detecting apparatus according to claim 25 wherein said pressure transmitting medium further has a working portion for causing movement of said diaphragm on said optical fiber.

27. A physical quantity detecting apparatus according to claim 26 wherein said pressure transmitting medium further has a pressure transmitter for transmitting movement of said diaphragm to said working portion.

28. A physical quantity detecting apparatus according to claim 26 wherein said working portion is provided on one side of said diaphragm opposite to the other side to which a pressure is applied.

29. A physical quantity detecting apparatus according to claim 25 comprising a bending action structure responsive to movement of said diaphragm to provide an action to curve said optical fiber.

30. A physical quantity detecting apparatus according to claim 28 wherein said bending action structure includes, an optical fiber supporting structure for supporting said optical fiber at two points; and a bending stress structure responsive to pressing force exerted by said diaphragm to apply bending stress to said optical fiber between said two supporting points.

31. A physical quantity detecting apparatus according to claim 28 wherein said bending action structure has a two-member structure including:

an optical fiber supporting member for supporting said optical fiber at two points; and a diaphragm member including said diaphragm for transmitting movement of said diaphragm to said optical fiber between said two support points.

32. A physical quantity detecting apparatus according to claim 31 wherein said two-member structure is unified into an integral structure in the form of a module.

33. A physical quantity detecting apparatus according to claim 32 wherein said optical fiber is cut into sections having a necessary length and each section is mounted, at its ends, with an optical connector.

34. A physical quantity detecting apparatus according to claim 23 wherein said physical quantity applying means has:

a groove for receiving said optical fiber; and means for applying pressure to said optical fiber positioned in said groove.

35. A physical quantity detecting apparatus according to claim 24 wherein said pressure transmitting medium is formed, at least part thereof, of a thermal conductor and serves as radiation means for radiating heat generated near said optical fiber.

36. A physical quantity detecting apparatus according to claim 23 wherein said physical quantity is an internal pressure in a plurality of cylinders of an internal combustion engine.

37. A physical quantity detecting apparatus according to claim 36 wherein said optical fiber is laid in the vicinity of each of said plurality of cylinders.

38. A physical quantity detecting apparatus according to claim 37 wherein said optical fiber is disposed in a gasket of said engine in the area of said plurality of cylinders.

39. A physical quantity detecting apparatus according to claim 37 wherein said optical fiber is disposed near ignition plugs of said plurality of cylinders.

40. A physical quantity detecting apparatus according to claim 35 wherein said optical fiber is disposed so as to be exposed to the interior of each of said plurality of cylinders.

41. A physical quantity detecting apparatus according to claim 37 wherein said optical fiber is subjected to a predetermined preliminary stress even when said internal combustion engine is in the non-combustion state.

42. A physical quantity detecting apparatus according to claim 26 wherein said physical quantity applying means has pressure transmitting means for applying pressure to said optical fiber; and each of said plurality of cylinders is provided with a pressure sensing portion including a first space for accommodating a pressure receiving portion of said optical fiber and said pressure transmitting means and a second space for admitting internal pressure in a cylinder to said optical fiber and includes internal pressure seal means for sealing a spatial gap between said first and second spaces.

43. A physical quantity detecting apparatus according to claim 42 wherein said internal pressure seal means is made of a material of high thermal conductivity and acts as means for radiating heat generated near said optical fiber.

44. A physical quantity detecting apparatus according to claim 42 wherein said pressure receiving portion of said optical fiber and said pressure transmitting means are assembled into a block with said internal pressure seal means.

45. A physical quantity detecting apparatus according to claim 42 wherein said first and second spaces are formed in a gasket of said cylinders.

46. A physical quantity detecting apparatus according to claim 45 wherein said second space opens to the interior of said cylinder at a semi-circular surface of the cylinder inner surface opposing an exhaust manifold.

47. A physical quantity detecting apparatus according to claim 45 wherein said gasket includes at least one layer stamped for formation of said first and second spaces and said layer and other gasket layers are overlapped with each other to form said first and second spaces.

48. A physical quantity detecting apparatus according to claim 45 wherein a pressure receiving space is in communication with said second space, said pressure transmitting means responsive to pressure in said pressure receiving space and said optical fiber applied with a pressing pressure by said pressure transmitting means are arranged in a direction of thickness of said gasket.

49. A physical quantity detecting apparatus according to claim 42 wherein said first and second spaces are formed in an ignition plug.

50. A physical quantity detecting apparatus according to claim 36 wherein said position information generating means is means for generating position information on the basis of a rotation angle of the crank shaft of said internal combustion engine.

51. A physical quantity detecting apparatus according to claim 36 wherein said position information generating means comprises means for generating position information on the basis of ignition timings of ignition plugs of said plurality of cylinders.

52. A physical quantity detecting apparatus according to claim 7 further comprising conversion means for converting said physical quantity into pressure, wherein said physical quantity applying means comprises means for applying a pressure resulting from conversion by said conversion means to said optical fiber.

53. A physical quantity detecting apparatus according to claim 52 wherein said physical quantity is temperature and said conversion means is means for converting temperature into pressure.

54. A physical quantity detecting apparatus according to claim 53 wherein said conversion means is formed of bimetal member.

55. A physical quantity detecting apparatus according to claim 52 wherein said physical quantity is acceleration and said conversion means is means for converting acceleration into pressure.

56. A physical quantity detecting apparatus utilizing an optical fiber, comprising:

at least one birefringent index optical fiber;

at least one light emitting means for emitting an incident light beam on said optical fiber;

at least one light receiving means for detecting the light power of an outgoing light beam from said optical fiber;

physical quantity applying means for bending said optical fiber on the basis of at least one physical quantity to be measured so as to change the power of light passing through said optical fiber; and means for detecting said physical quantity on the basis of a detection signal representing light power as received from said light receiving means.

57. An apparatus for controlling an internal combustion engine by detecting cylinder internal pressure through the use of optical fiber, comprising:

a plurality of cylinders;

at least one optical fiber laid in the vicinity of all of the cylinders;

at least one light emitting means for emitting an incident light beam on said optical fiber;

at least one light receiving means for detecting the light power of an outgoing light beam from said optical fiber;

pressure applying means for applying stress to said optical fiber on the basis of an internal pressure of said plurality of cylinders so as to change the power of light passing through said optical fiber; and operation means for detecting an internal pressure in said plurality of cylinders on the basis of a detection signal representing light power as received from said light receiving means and for calculating at least one ignition timing, fuel amount and air amount for each cylinder on the basis of detected internal pressure in said plurality of cylinders.

58. An internal combustion engine control apparatus according to claim 57 further comprising cylinder information generating means for generating cylinder information concerning one of said plurality of cylinders which applies to said optical fiber a cylinder internal pressure having a distinctive changing point.

* * * * *